US008766983B2

(12) United States Patent
Marks et al.

(10) Patent No.: US 8,766,983 B2
(45) Date of Patent: Jul. 1, 2014

(54) METHODS AND SYSTEMS FOR PROCESSING AN INTERCHANGE OF REAL TIME EFFECTS DURING VIDEO COMMUNICATION

(75) Inventors: Richard Marks, Foster City, CA (US); Gary M. Zalewski, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1166 days.

(21) Appl. No.: 11/800,899

(22) Filed: May 7, 2007

(65) Prior Publication Data

US 2007/0268312 A1 Nov. 22, 2007

Related U.S. Application Data

(60) Provisional application No. 60/746,640, filed on May 7, 2006, provisional application No. 60/746,773, filed on May 8, 2006, provisional application No. 60/746,777, filed on May 8, 2006.

(51) Int. Cl.
*G06T 13/00* (2011.01)

(52) U.S. Cl.
USPC ............................. 345/473; 345/419; 345/420

(58) Field of Classification Search
None
See application file for complete search history.

(56) References Cited

U.S. PATENT DOCUMENTS 5,983,369 A * 11/1999 Bakoglu et al. .................. 714/46
6,219,045 B1 4/2001 Leahy et al. .................. 345/331
6,272,231 B1 8/2001 Maurer et al.

(Continued)

FOREIGN PATENT DOCUMENTS

EP 0 654 749 A2 5/1995
EP 0 999 518 A1 5/2000

(Continued)

OTHER PUBLICATIONS

European Search Report—App.No.10154578.8-2218 dated Jun. 5, 2010-Munich (7 pages).

(Continued)

*Primary Examiner* — Said Broome
(74) *Attorney, Agent, or Firm* — Martine Penilla Group, LLP

(57) ABSTRACT

Computer implemented methods for interactively modifying a video image are provided. The video image can be transmitted between a first user and a second user using a computer program that is executed on at least one computer in a computer network. Additionally, the first user and the second user interact through respective computing systems that at least partially execute the computer program. A video capture system is provided that is interfaced with the computer program that can be used to capture real-time video of the first user. The method continues by identifying components of the video image of the first user that can be modified using real-time effects in the captured real-time video. In another operation, the method identifies controller input from either the first user or the second user. The controller input detected by the computing system is identified to determine which of the identified components of the first user will be modified. In response to the identified controller input, another operation of the method augments the real-time video captured of the first user by applying the real-time effects to the identified components of the first user. The method then displays the augmented real-time video of the first user on a screen connected to the computing system of one or both of the first and second users.

11 Claims, 17 Drawing Sheets

(56) References Cited

U.S. PATENT DOCUMENTS

| | | | |
|---|---|---|---|
| 6,400,374 B2 | 6/2002 | Lanier | 345/630 |
| 6,553,138 B2 * | 4/2003 | Rozin | 382/154 |
| 6,714,660 B1 | 3/2004 | Ohba | 382/103 |
| 6,767,287 B1 | 7/2004 | McQuaid et al. | 463/42 |
| 6,867,797 B1 * | 3/2005 | Pound | 348/14.12 |
| 6,894,686 B2 * | 5/2005 | Stamper et al. | 345/419 |
| 7,224,367 B2 * | 5/2007 | Miyahara et al. | 345/473 |
| 2003/0100371 A1 | 5/2003 | Gatto et al. | |
| 2004/0006767 A1 | 1/2004 | Robson et al. | 725/28 |
| 2004/0240740 A1 | 12/2004 | Ohba | 382/190 |

FOREIGN PATENT DOCUMENTS

| | | |
|---|---|---|
| EP | 1 176 559 A2 | 1/2002 |
| KR | 2005 0015283 A | 2/2005 |
| WO | WO 02/097732 A1 | 12/2002 |
| WO | WO 03/058518 A2 | 7/2003 |
| WO | WO 2006/039371 A2 | 4/2006 |

OTHER PUBLICATIONS

IGN: "EA Sports Fight Night 3 Review," Feb. 20, 2006 XP002577801—Retrieved from Internet: URL:http://uk.xbox360.ign.com/articles/689/689318p1.html (p. 1,3).

EA Sports: "Fight Night Round 3 Manual" Feb. 20, 2006 XP002577800—Retrieved from Internet: URL:http://www.replacementdocs.com/request.php?4821> (p. 10).

European Search Report and Written Opinion —App.No. 07776884.4 dated Dec. 8, 2009-Munich (10 pages).

PCT International Search Report and Written Opinion/US2007/011141 dated Sep. 9, 2008-ISA/US (9 pages).

\* cited by examiner

APPLIED RTE

APPLIED RTE

APPLIED RTE

APPLIED INTERACTIVE RTE

METHODS AND SYSTEMS FOR PROCESSING AN INTERCHANGE OF REAL TIME EFFECTS DURING VIDEO COMMUNICATION

CLAIM OF PRIORITY

The present application claims priority from (1) Provisional Application No. 60/746,640, entitled "METHODS AND SYSTEMS FOR PROCESSING AN INTERCHANGE OF REAL TIME EFFECTS DURING VIDEO COMMUNICATION", filed on May 7, 2006, (2) U.S. Provisional Application No. 60/746,773, titled METHODS AND SYSTEMS FOR INTERACTIVE COMMUNICATIONS WITH REAL TIME EFFECTS AND AVATAR ENVIRONMENT INTERACTION, filed on May 8, 2006, and (3) Provisional Application No. 60/746,777, entitled "SYSTEM AND METHOD FOR PROVIDING AFFECTIVE CHARACTERISTICS TO COMPUTER GENERATED AVATAR DURING GAMEPLAY" filed on May 8, 2006, each of which is herein incorporated by reference.

CROSS REFERENCE TO RELATED APPLICATIONS

The present application is related to U.S. patent application Ser. No. 11/800,843, entitled "METHODS FOR INTERACTIVE COMMUNICATIONS WITH REAL TIME EFFECTS AND AVATAR ENVIRONMENT INTERACTION", filed on the same date as the instant application and, U.S. patent application Ser. No. 11/801,036, entitled "SYSTEM AND METHOD FOR PROVIDING AFFECTIVE CHARACTERISTICS TO COMPUTER GENERATED AVATAR DURING GAMEPLAY" filed on the same date as the instant application, each of which is herein incorporated by reference.

BACKGROUND OF THE INVENTION

1. Field of the Invention

The present invention relates generally to interactive multimedia entertainment and more particularly, interactive user control and manipulation of representations of users in a virtual space.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms include the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, wherein a user can interactively play against or with other users over the Internet.

As game complexity continues to intrigue players, gaming software and hardware manufacturers have continued to innovate to enable additional interactivity. In reality, however, the way in which users interact with a game has not changed dramatically over the years. Commonly, users still play computer games using hand held controllers or interact with programs using mouse pointing devices.

In view of the foregoing, there is a need for methods and systems that enable more advanced user interactivity with game play.

SUMMARY

An invention is described for improving and enhancing verbal and non-verbal communications. The system improves and enhances verbal and non-verbal communication by automatic and user controlled application of Real-Time Effects (RTE) to audio and video input in a networked environment. The input can be for communications commonly referred to as "chat", and specifically for video based chat. Video chat can occur over a network, such as the Internet. The Effects defined herein are applicable to both video and audio, and combinations thereof. During a chat session, persons involved in some discussion can interactively cause the application of an RTE on the video image of the person he/she is communicating with or cause the application of an RTE on his/her own vide image in substantially real-time. An RTE, as will be described in greater detail below, is an effect that is selected by one of the participants of the chat, which can be applied and integrated into the video image and/or audio of one of the participants. The effect can take on many forms, such as video pixel patches that can be integrated into specific portions of one of the participants faces, bodies, or surroundings. The video pixel patches are preferably applied in such a way that they integrate into the moving video frames, and therefore, the integration appears to be substantially done in real-time.

In one embodiment, a computer implemented method for interactively modifying a video image is disclosed. The video image can be transmitted between a first user and a second user using a computer program that is executed on at least one computer in a computer network. Additionally, the first user and the second user interacting through respective computing systems that are at least partially executing the computer program. The method begins by providing a video capture system interfaced with the computer program that can be used to capture real-time video of the first user. The method continues by identifying components of the video image of the first user that can be modified using real-time effects in the captured real-time video. In another operation, the method identifies controller input from either the first user or the second user. The controller input detected by the computing system is identified to determine which of the identified components of the first user will be modified. In response to the identified controller input, another operation of the method augments the real-time video captured of the first user by applying the real-time effects to the identified components of the first user. The method concludes by displaying the augmented real-time video of the first user on a screen connected to the computing system of one or both of the first and second users.

In another embodiment, a computer implemented method for interactively modifying a video image and audio is disclosed. The video image and audio transmitted can be transmitted between a first user and a second user using a computer program that is executed on at least one computer in a computer network to enable a chat communication. The first user and the second user can interact through respective computing systems that are at least partially executing the computer program. The method begins by providing a video and audio capture system on each of the respective computing systems of the first and second users. The video and audio capture system interfaced with the computer program to enable the chat communication. The method continues by capturing real-time video and audio of the first user through the video and audio capture system connected to the computing system of the first user. In another operation, the method identifies components of the video image of the first user that can be modified using real-time effects in the captured real-time video. In yet another operation, the method identifies audio segments of audio captured by the video and audio capture system that can be modified using real-time effects. The method continues by identifying user input from either the first user or the second user, to determine which of the identified audio segments of the first user will be modified. In response to the identified user input, another operation of the method is to apply the real-time effects to either one or both of the identified components of the first user or the audio segments. Another operation of the method is to output real-time video and audio of the first user on a screen and an audio output device connected to the computing system of one or both of the first and second users. The output real-time video and audio includes the applied real-time effects. As used herein, real-time is substantially real-time, and the delay should be minimal so as to not noticeably impact the flow of display data.

In yet another embodiment, a computer implemented method for interactively modifying a video image during chat communication in conjunction with game play over a network is disclosed. The method begins by providing a video and audio capture system on respective computing systems of a first and second users. The video and audio capture system interfaced with the computer program to enable the chat communication. The method continues by capturing real-time video and audio of a first user through the video and audio capture system connected to the computing system of the first user. In another operation, the method identifies components of the video image of the first user that can be modified using real-time effects in the captured real-time video. In still another operation, the method identifies audio segments of audio captured by the video and audio capture system that can be modified using real-time effects. In yet another operation, the method identifies user input from either the first user or the second user. The identification of the user input determining which of the identified audio segments of the first user will be modified. The method continues by applying real-time effects to either one or both of the identified components of the first user or the audio segments in response to the identified user input. In another operation, the method outputs real-time video and audio of the first user on a screen and audio output equipment connected to the computing system of one or both of the first and second users. The output real-time video and audio includes the applied real-time effects.

The advantages of the present invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is described for improving and enhancing verbal and non-verbal communications. The system improves and enhances verbal and non-verbal communication by automatic and user controlled application of Real-Time Effects (RTE) to audio and video input in a networked environment. The input can be for communications commonly referred to as "chat", and specifically for video based chat. Video chat can occur over a network, such as the Internet. The Effects defined herein are applicable to both video and audio, and combinations thereof. During a chat session, persons involved in some discussion can interactively cause the application of an RTE on the video image of the person he/she is communicating with or cause the application of an RTE on his/her own video image in substantially real-time. An RTE, as will be described in greater detail below, is an effect that is selected by one of the participants of the chat, which can be applied and integrated into the video image and/or audio of one of the participants. The effect can take on many forms, such as video pixel patches that can be integrated into specific portions of one of the participants faces, bodies, or surroundings. The video pixel patches are preferably applied in such a way that they integrate into the moving video frames, and therefore, the integration appears to be substantially done in real-time. It will be obvious to one skilled in the art, that the present invention may be practiced without some or all of these specific details. In other instances, well known process operations have not been described in detail in order not to unnecessarily obscure the present invention.

Figure 1:
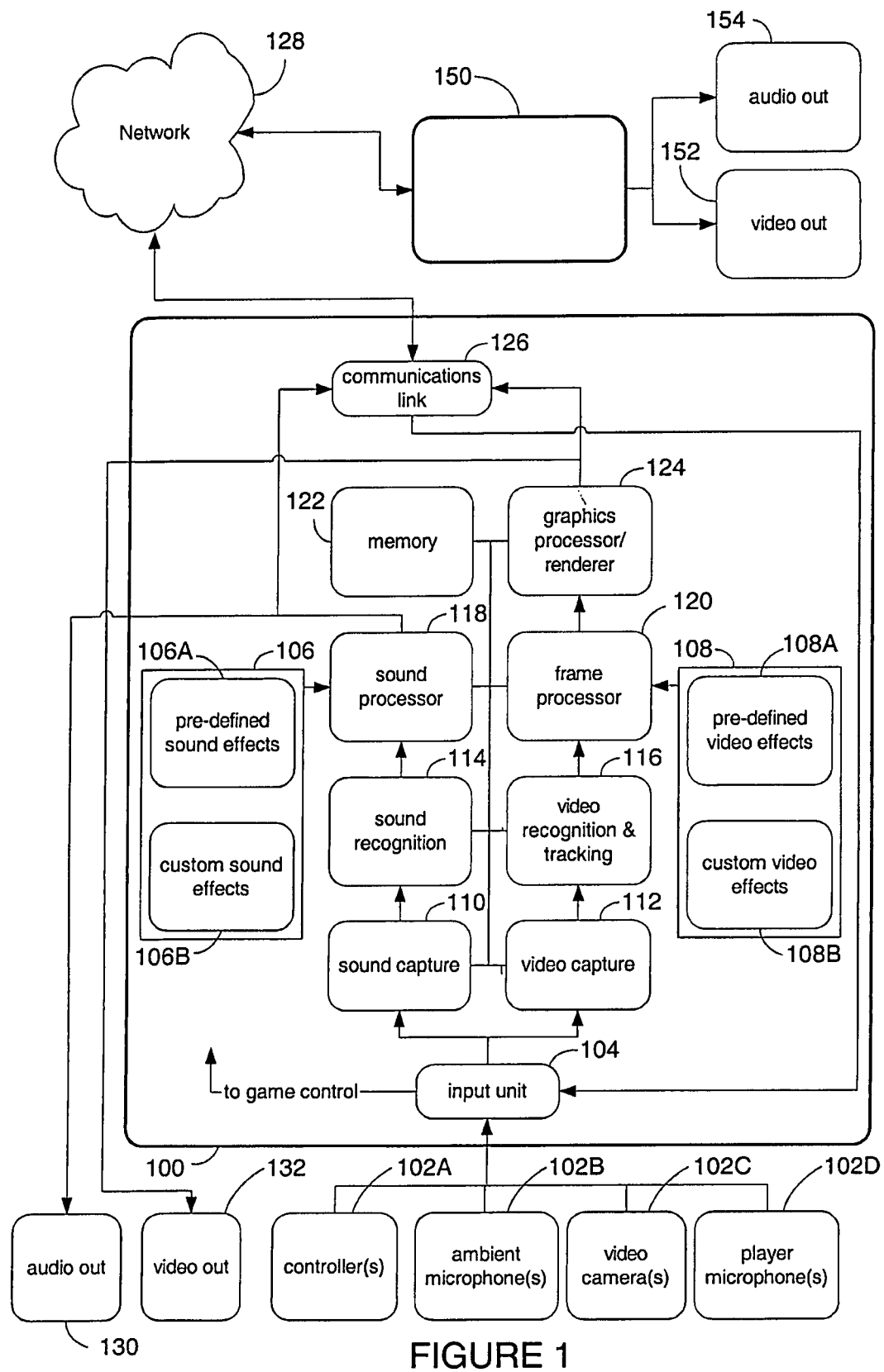
FIG. 1 is a simplified block diagram of a high level overview of a system for improving and enhancing verbal and non-verbal communications in accordance with one embodiment of the present invention.

FIG. 1 is a simplified block diagram of a high level overview of a system for improving and enhancing verbal and non-verbal communications in accordance with one embodiment of the present invention. As shown in FIG. 1, a system 100 is capable of inputting data from at least one controller 102A, at least one ambient microphone 102B, at least one video camera 102C, and at least one player microphone 102D.

In one embodiment, the video camera captures image frames and digitizes the image frames to define a pixel map. Video output from the video camera 102C is initially fed into an input unit 104. The input unit 104 can be in the form of circuitry or a software-controlled driver. From the input unit 104, the video output from the video camera 102C is passed to a video capture unit 112 and further processed by a video recognition and tracking unit 116. The video recognition and tracking unit 116 is meant to recognize facial features and body parts of a user along with the movements of the user. Additionally, the video recognition and tracking unit 116 may be capable of capturing the background surroundings, and other elements within the captured images. A frame processor 120 uses the output from the video recognition and tracking unit 116 and can augment the image with video from a video effects library 108. The video effects library 108 contains at least two libraries shown as a pre-defined video effects 108A and custom video effects 108B, which can be selectively applied by the user or automatically applied by the system 100. It is possible for the video effects library 108 to contain fewer or more libraries so long as the libraries contain pre-defined and custom video effects. In operation, the frame processor outputs data to a graphics processor/renderer 124 that computes and outputs the final images displayed to the user, shown as video out 132. The graphics processor/renderer 124 also feeds information regarding the state of the system 100 to a communications link 126.

The audio input from the ambient microphones 102B and the player microphones 102D may be initially passed through the input unit 104 and then captured by a sound capture unit 110 that may pass the captured data to a sound recognition unit 114. Sound data is then passed to a sound processor 118 that can also receive input from a sound effects library 106. The sound effects library 106 contains at least two libraries shown as predefined sound effects 106A and custom sound effects 106B that can be selectively applied by the user or automatically applied by the system 100. It is possible for the sound effect library to contain fewer or more libraries so long as it has predefined and custom audio effects. In one embodiment, the sound processor 118 outputs the final mixed sounds for the system 100, shown as audio out 130, and feeds information regarding the state of the system 100 to a communications link 126.

In one embodiment, the communications link 126 connects the system 100 to a network 128 that can connect system 100 with a remote system 150 that is capable of interfacing with the system 100 and is operated by a remote user (not shown). FIG. 1 shows the system 100 being connected to a single remote system 150 via the network 128, but it should be understood that a plurality of remote systems 150 and their corresponding users can be connected to system 100 via the network 128. The remote system 150 is capable of understanding the state of the system 100 as reported by the sound processor 118 and the graphics processor/renderer 124. The remote system 150 combines the information regarding the state of the system 100 with input from the remote user before producing audio out 154 and video out 152.

The controllers 102A accept input from the users of the system 100 and the input may be processed simultaneously with the video and audio input. In one embodiment of the present invention the user presses a button or combination of buttons on the controller to initiate or apply an RTE. In another embodiment, an RTE is automatically initiated when triggered by an event defined in the software being processed by the system 100. As noted above, the RTE is an effect that is applied to a video communication participant's image, during video rendering. For example, the RTE can be applied to a portion of the participant's face, surroundings, etc., and the RTE is applied in substantially real-time. In such an example, the RTE may be applied such that the applied effect blends in to the user's image or surroundings. The applied RTE may also be configured to track the movements of the user's image or surroundings, so that the RTE can change as the user changes. In this embodiment, allowing the RTE to be applied dynamically to a moving image and change with the image allows for a more realistic rendition of the RTE during a dynamic communication session between video chat participants.

Figure 2:
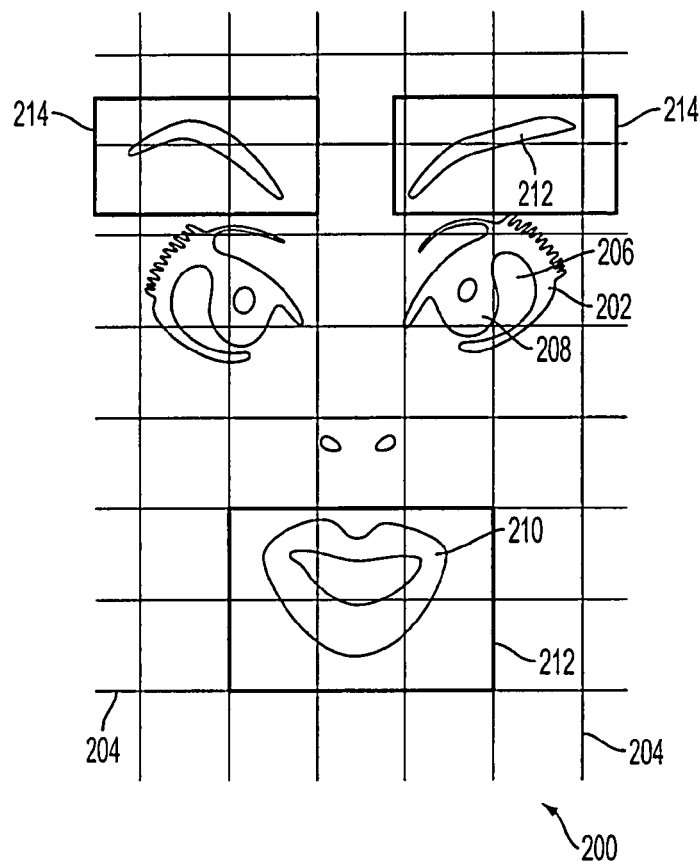
FIG. 2 is an illustration of facial features recognized and tracked by the video recognition and tracking unit in accordance with one embodiment of the present invention.

FIG. 2 is an illustration of facial features recognized and tracked by the video recognition and tracking unit 116 in accordance with one embodiment of the present invention. As shown in FIG. 2 the video image acquired from the video camera is analyzed to recognize and track the eyes 202 from the face of a user 200. In one embodiment the video recognition and tracking unit 116 can recognize a users' eyes by overlaying a grid system 204 on the video image and searching for color contrast between the exposed sclera 206 and the iris 208 and/or surrounding skin tone. Once the eyes 202 are located, the video recognition and tracking unit 116 can use the grid system 204 and facial characteristics statistical data to recognize a mouth 210 within a mouth area 112 and eyebrows 212 within eyebrow areas 214. Recognizing and tracking the eyes 202, the eyebrows 212 and the mouth 210 of the user will enable improvement and enhancement of verbal and non-verbal communications of users of the systems 100. Note that the present invention is not limited to the previously mentioned methods to track facial features and that other methods can be used to recognize and track facial features. It should also be noted that the system 100 is not limited to tracking facial features, but can also be applied to track arms, hands, torsos, legs, feet, and even portions of the surroundings. Additionally, the grid system 204 is provided as a simplistic example of the analysis of specific portions of a captured image. Finer grids may also be used, as well as pixel-by-pixel or pixel group analysis and comparisons with a database of recognition pixel data. Additionally, although specific description is provided regarding an image, it should be understood that the RTEs may be applied to multiple still images as well as the multiple images that make up a video sequence of images. The video may consist of individual full images or compressed video, such as those defined in any one of the currently available MPEG compression standards, which are incorporated by reference.

Figure 3:
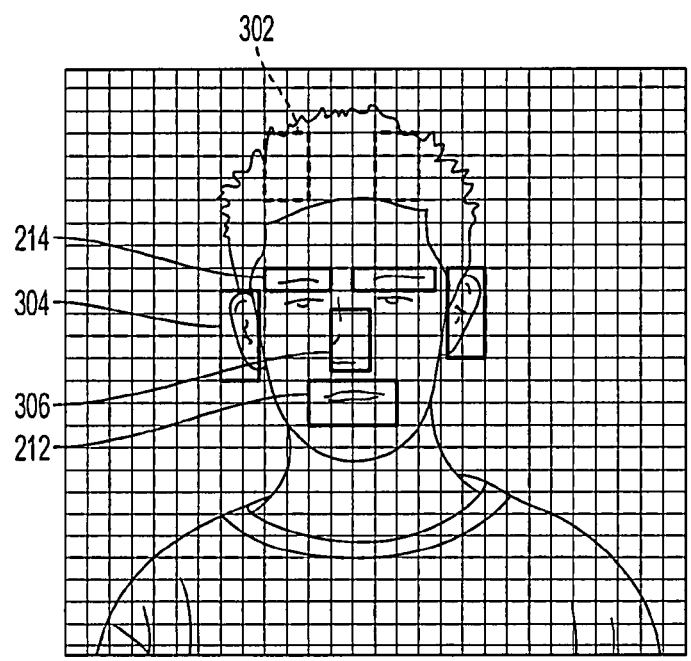
FIG. 3 shows an example of recognition and tracking of facial features on a video image, in accordance with one embodiment of the invention.

FIG. 3 shows an example of recognition and tracking of facial features on a video image, in accordance with one embodiment of the invention. In one embodiment, a video capture system such as a video camera is used to capture image frames and the image frames can be digitized by the camera to define a pixel map of the image frames. In one embodiment, pixel regions of the video image are used to identify characteristics of a user captured in the video image. FIG. 3 shows pixel regions that can be used to identify and track an eyebrow area 214 and a mouth area 212 over one or more frames. Additional pixel regions that the system 100 could identify and track include pixel regions for ears 304, a nose 306 and areas of the head 302. In one example, the identified and tracked areas of a user can be subjected to an RTE stored in the video effects library 108, that will enhance the communications experience between users. Again, it is noted that the application of RTE is not restricted nor limited to facial features.

In one embodiment, video chat is conducted at relatively low video resolutions. Because of the relatively low video resolution a user's facial expression may not always be clearly conveyed. As will be shown in FIG. 4A, the predefined video effects 108A can be grouped into different categories depending on the facial feature they modify. In one embodiment the predefined video effects 108A are cartoonish animations blended with the real time video that overly to distort a target user's facial features to, for example, ensure remote users understand the emotional state of the sender. Similarly, the predefined video effects could be used in a comical nature for taunting if a sender applies a predefined video effect to a remote user. Because cartoonish animations assist in conveying emotions to remote users the communication experience between users of the video chat is enhanced.

Figure 4A:
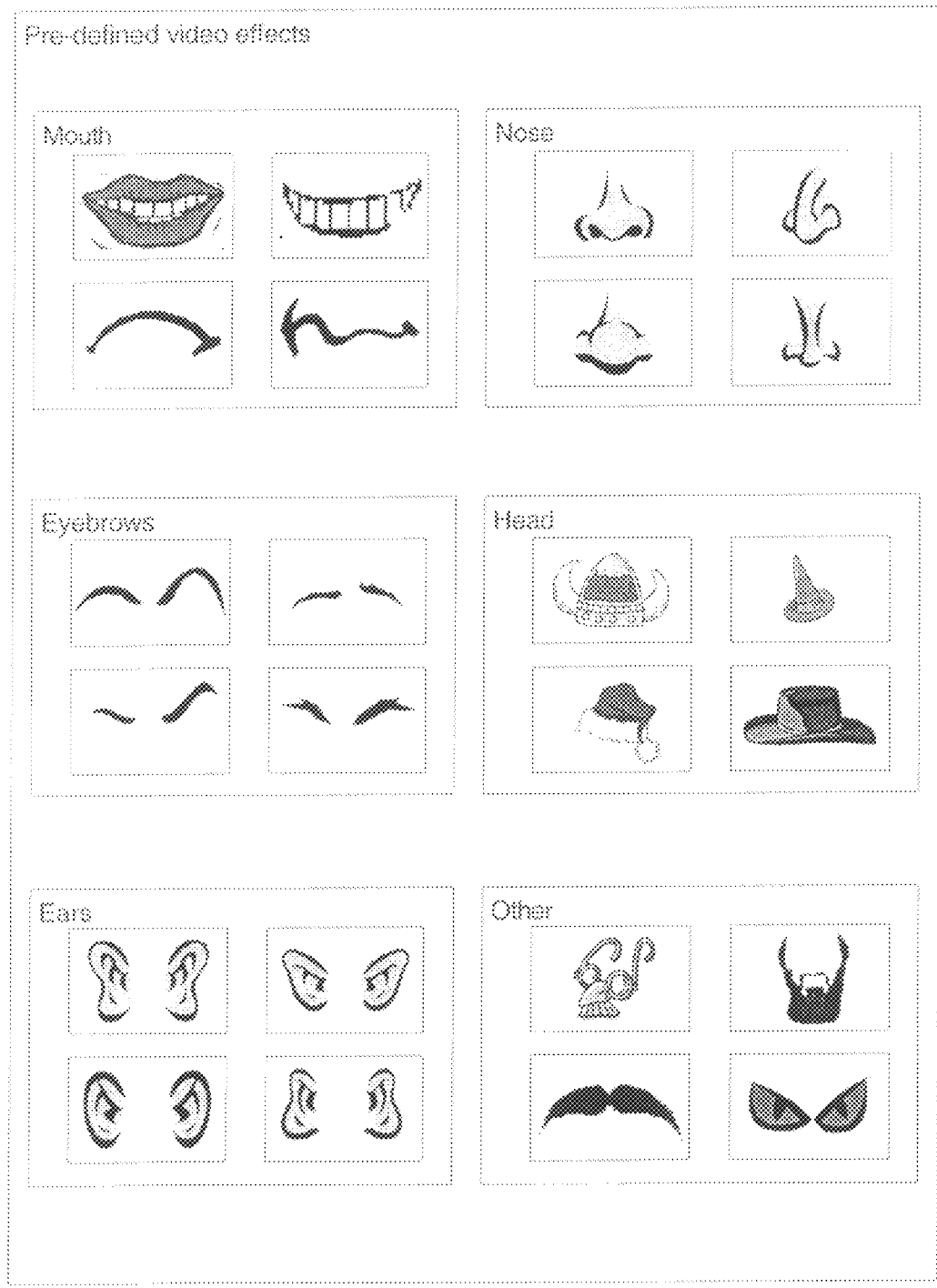
FIG. 4A shows example groups of the predefined video effects library in accordance with one embodiment of the present invention.

FIG. 4A shows example groups of the predefined video effects library 108A in accordance with one embodiment of the present invention. Though the graphics in FIG. 4 are static, the present invention deals with animated graphics to create substantially real time video effects. The effects are substantially real time because there is a slight delay in the application of the effect due to the complex, but rapid, calculations necessary to apply the RTE. However, the end result is a video effect that appears to be substantially presented in real time during the video communication. If applied to the user the RTE can follow the movement of the user moving fluidly as if the selected RTE were attached to or integrated with the user receiving the RTE. The pre-defined video effects 108A are video effects that are loaded onto the system 100 by the system manufacturer, as part of software processed by the system 100 or downloaded over the network 128. Regardless of how the pre-defined video effects 108A are loaded on the system 100 it may be possible that they may be common among all users of systems capable of interfacing with the system 100.

For example, pre-defined video effects for the mouth area 212 could include smiles, frowns, puckers and grimaces. Pre-defined video effects for eyebrow area 214 could include various eyebrow animations including scowls and a variety of animations to express emotions of surprise or doubt. Applying dangling earrings or making pointy elf like ears are effects that could be applied to ear area 304 and morphing a clown nose or extending the nose "Pinocchio style" to infer lying could be applied to nose area 306. Additionally, adding horns to head area 302 is possible along with a variety of hats and halos. More examples of RTE not shown in FIG. 4A are effects applied to a user's eyes such as making their eyes glow red, or pop out of their head or an exaggerated rolling of their eyeballs. Additionally, RTE can be applied to a user's arms, legs, feet and even the area surrounding a user.

In another embodiment there are pre-defined RTEs that enable a user to apply an entire theme to themselves or another user. For example, the groups defined in FIG. 4A would be completely different and include categories such as girls themes, baby themes, animal themes and celebration themes. Possible girls themes include a RTE where a user is suddenly dressed in a "Little Bo Peep" outfit and standing in a field with sheep. Under baby themes there could be a selection where a user is shown with a pacifier in their mouth wearing a diaper with a crib in the background accompanied by the sound of a baby crying. With the animal theme a user's face could be superimposed on a jackass and enlarged front teeth placed in their mouth. Additionally, under celebrations, a user could have a party hat on top of their head, confetti and tickertape falling from the sky and the sound of cheers in the background. The pre-defined video effects shown in FIG. 4A and the examples listed are not inclusive of all of the potential effects. One skilled in the art should recognize that the potential for effects is unlimited and only constrained by a programmer's imagination and moral fiber.

Figure 4B:
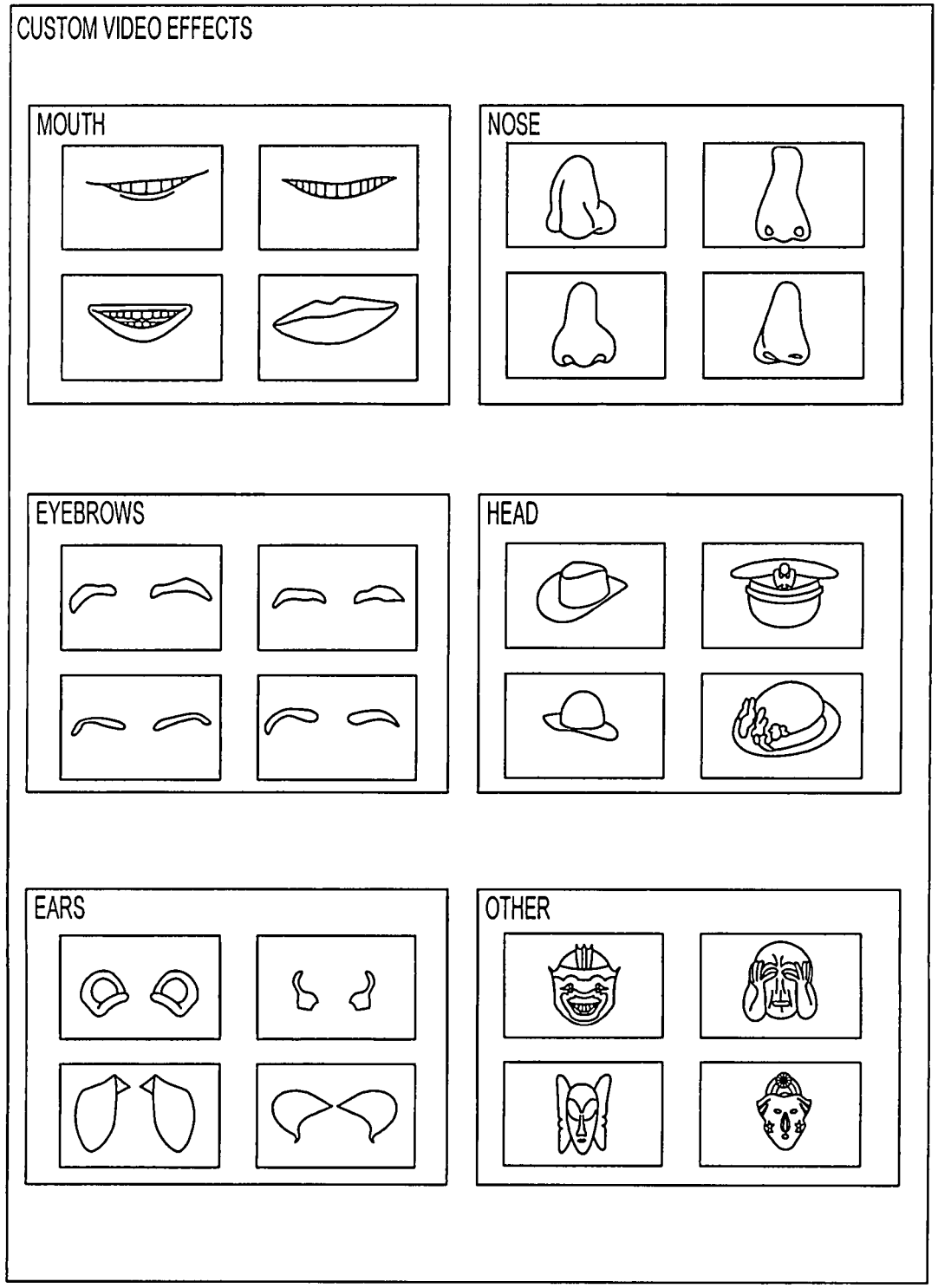
FIG. 4B shows the partial contents of the custom video effects library in accordance with one embodiment of the present invention.

FIG. 4B shows the partial contents of the custom video effects library 108B in accordance with one embodiment of the present invention. The custom video effects 108B are unique to one particular user and are created or customized by the user. The user can create custom video effects by recording and editing video or by taking pre-defined video effects and modifying them to their liking. Examples of what users could create or modify include animations of the user sticking their tongue out or an animation depicting the user vomiting. The user could also create animations of them smiling and replacing their teeth with fangs or revealing that some teeth are missing. It would also be possible to sell or license custom video effect using a model similar to mobile phone ringtones. For example a user would be able to visit a website or custom video effect portal where they would be able to download custom video effects after paying a license or sales fee. The examples listed are intended to be possible custom effects and are not intended to be restrictive.

FIGS. 5A-5F provide an example of how a user would apply a RTE to a remote user in accordance with one embodiment of the present invention. In this embodiment the user 504 whose screen name (m3rCy F1u5]-[) is displayed under his live video image 502 will apply a RTE to a target user 508 whose screen name (Marks) is displayed under his live video image 506. FIGS. 5A-5F show, as examples, still photographs as representative of live video images and it should be noted there could be more users engaged in the video chat connected by the network 128 rather than just the two users shown in the figures. In this embodiment the user 504 would initiate the application of a RTE by selecting which user the RTE will be applied to, in this case, the target user 508. The controller buttons associated with symbols 510 allow the user 504 to scroll through available users because, as discussed above, it is possible for more users to be connected using the network 128. The user 504 selects the target user 508 by pressing the L1 button on his controller at which point the user 504 will see the example RTE categories 512 shown in FIG. 5B. In this example the user 504 selects a video RTE by pressing L1. After selecting the video RTE the user 504 may be allowed to choose from the options shown in FIG. 5C. As previously mentioned, the system 100 can apply RTE to more than a user's face but this example is dealing with applying a RTE to the face of the target user 508.

The user 504 can scroll through more possible video effects by pressing the controller buttons corresponding to the symbols 510. Having selected to apply a RTE to the eyebrows of the target user 508 brings user 504 to the choices shown in FIG. 5D. At this point the user 504 selects the set of eyebrows he wants to apply to the target user 508. The user 504 can select from any of the eyebrows available in the predefined video effects 108A or his custom video effects 108B by scrolling through the possible selections. The system 100 can indicate which of the possible selections are from the custom video effects 108B by using different icons, colors, or fonts or any combination thereof.

Figure 5A:
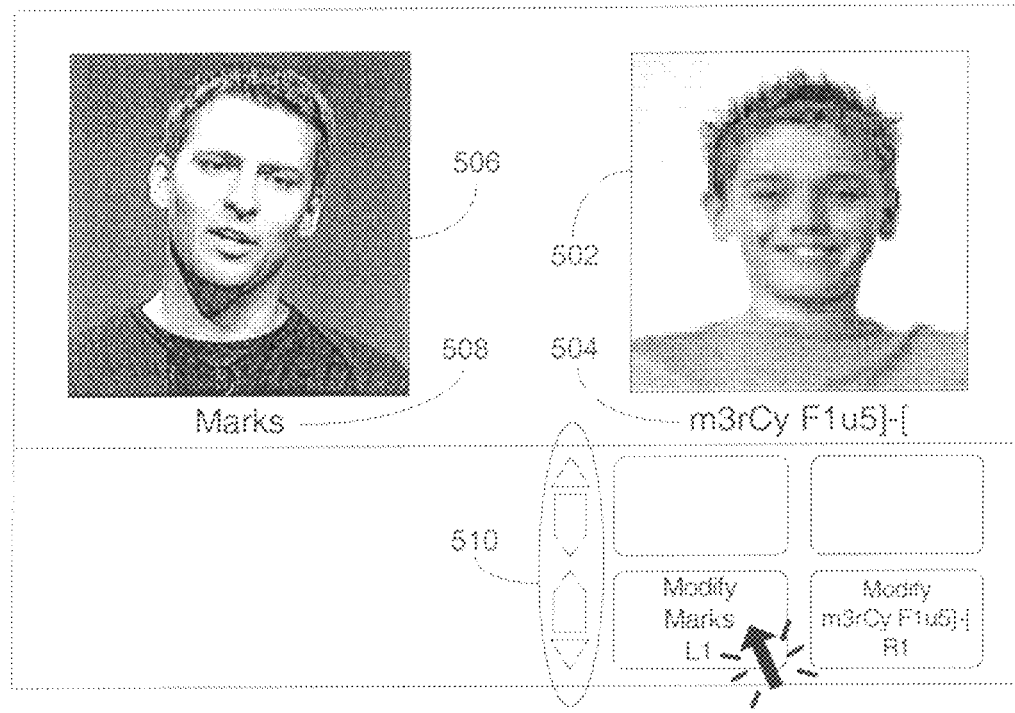
FIGS. 5A-5F provide an example of how a user would apply a RTE to a remote user in accordance with one embodiment of the present invention.
Figure 5B:
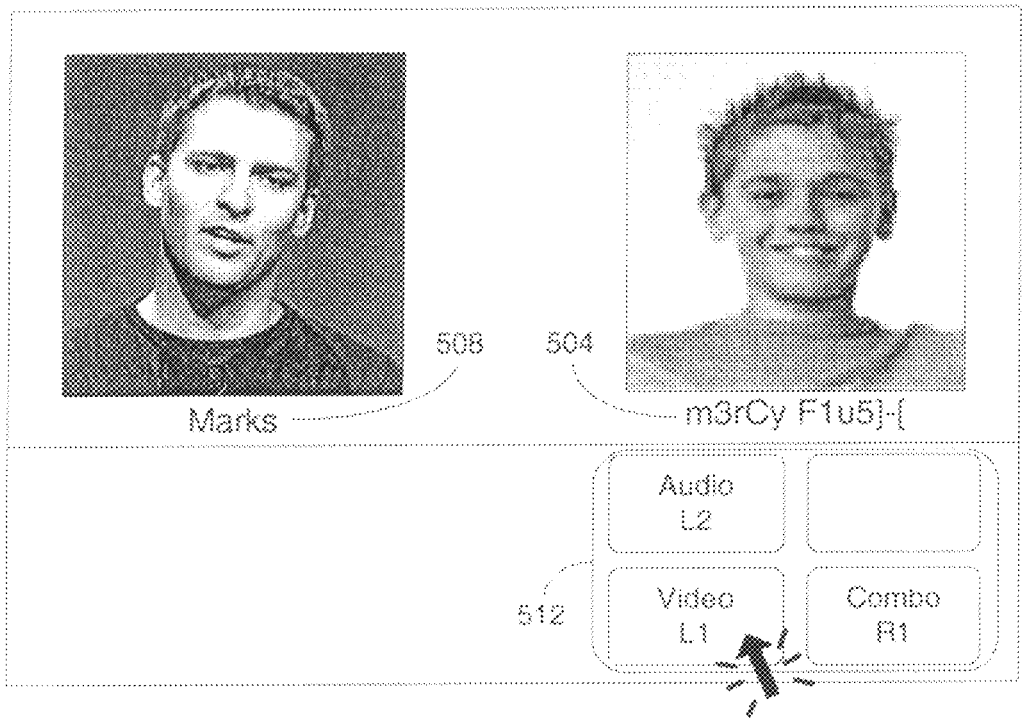
Figure 5C:
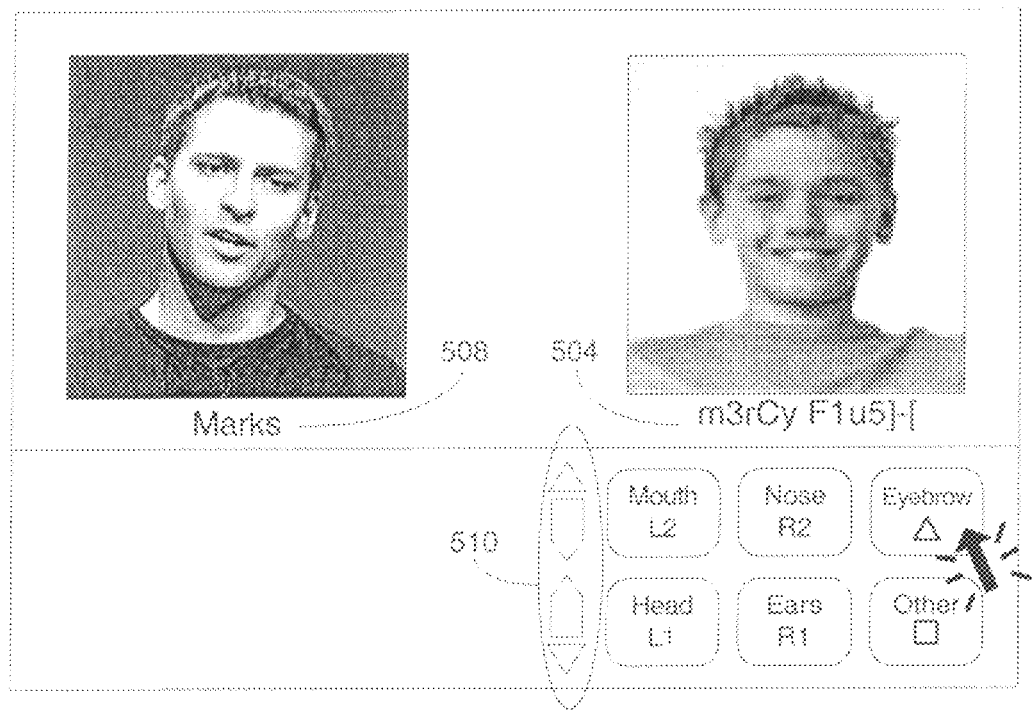
Figure 5D:
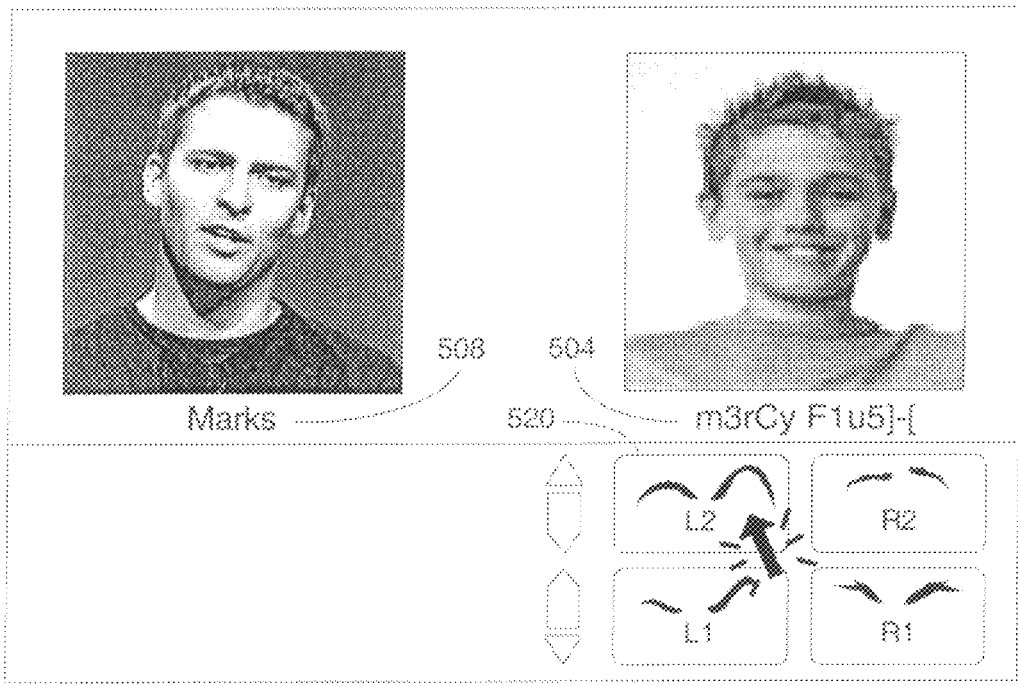
Figure 5E:
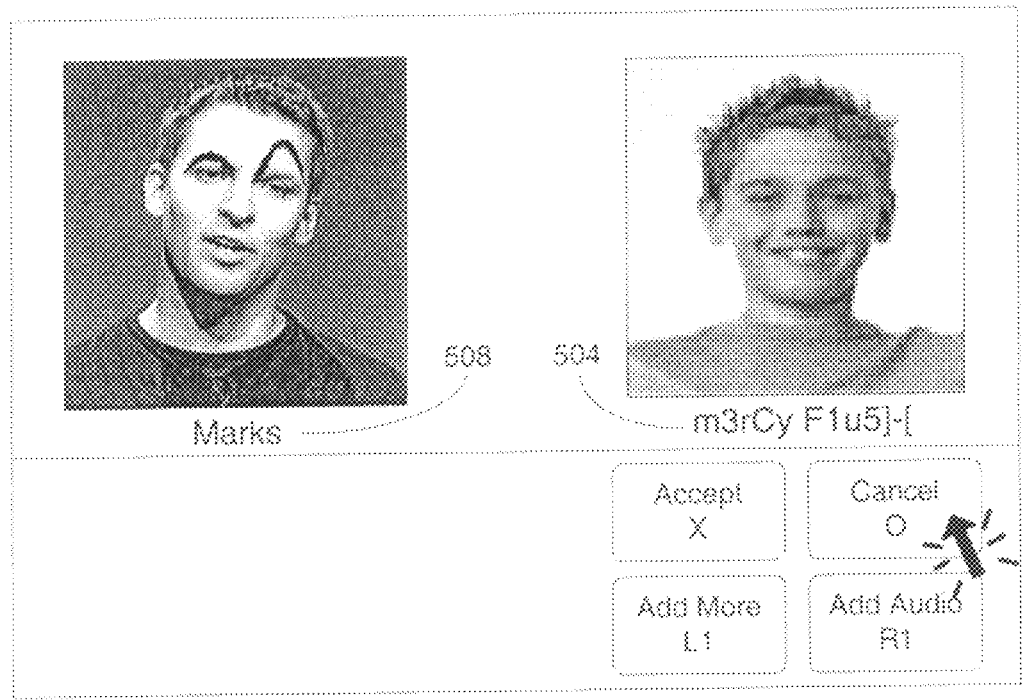
Figure 5F:
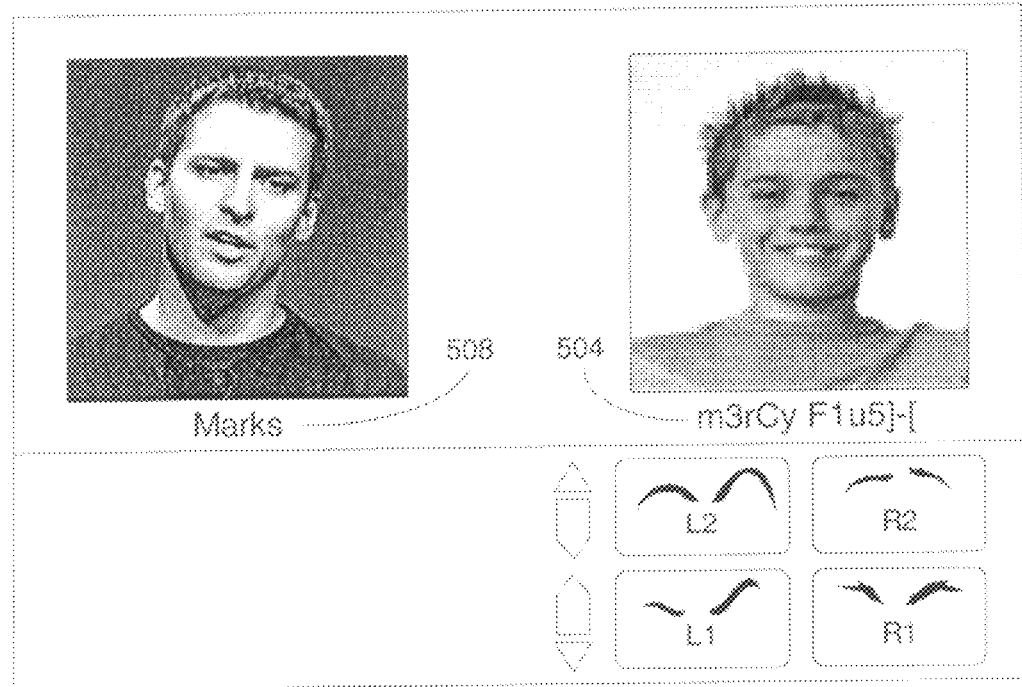

Continuing with this example the user 504 applies eyebrows 520 by pressing L2 which results in the graphic shown in FIG. 5E. In this example the eyebrows 520 are shown on the video feed from the target user 508 as a preview since the user 504 still has the option to accept or cancel the application of the RTE. In a different embodiment there is a separate preview window that would allow the user 504 to see the target user 508 with the applied RTE. This would maintain one window where there is an unaltered video feed from the target user 508. In FIG. 5F, the user 504 has canceled the application of the eyebrow RTE to the target user 508 and has returned to the previous menu where he can select different eyebrows from the video effects library.

Returning to FIG. 5E, note that the user 504 has the option to add more effects. In particular, the user 504 can press L1 to add video or press R1 to add audio. This feature allows the user 504 to add multiple RTE and preview the effects before sending them to the remote users. While this embodiment has used the controller buttons shown in 5A-5F, other embodiments can be manipulated using controllers responsive to relative positional movement and motion capable of transmitting signals via a wired or wireless link. In another embodiment, specific buttons on a controller or specific voice commands can be used to dynamically apply a predetermined RTE. For example, the user can program a button to always apply horns over the other person's head. This feature could be considered a "hot button" that can be quickly pressed so the RTE immediately shows up, without having to navigate through multiple selection screens. Once a hot button is programmed, it may be reprogrammed on demand.

Figure 6A:
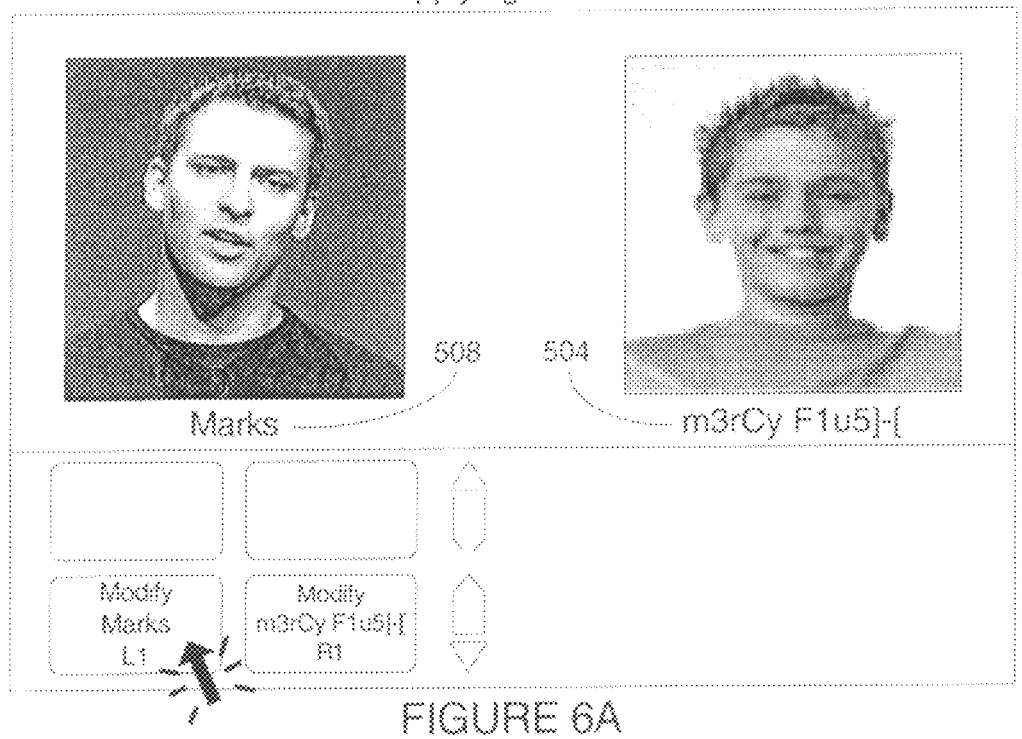
FIGS. 6A-6D illustrate how a user can apply a RTE to himself in order to emphasize an emotion in accordance with one embodiment of the present invention.
Figure 6B:
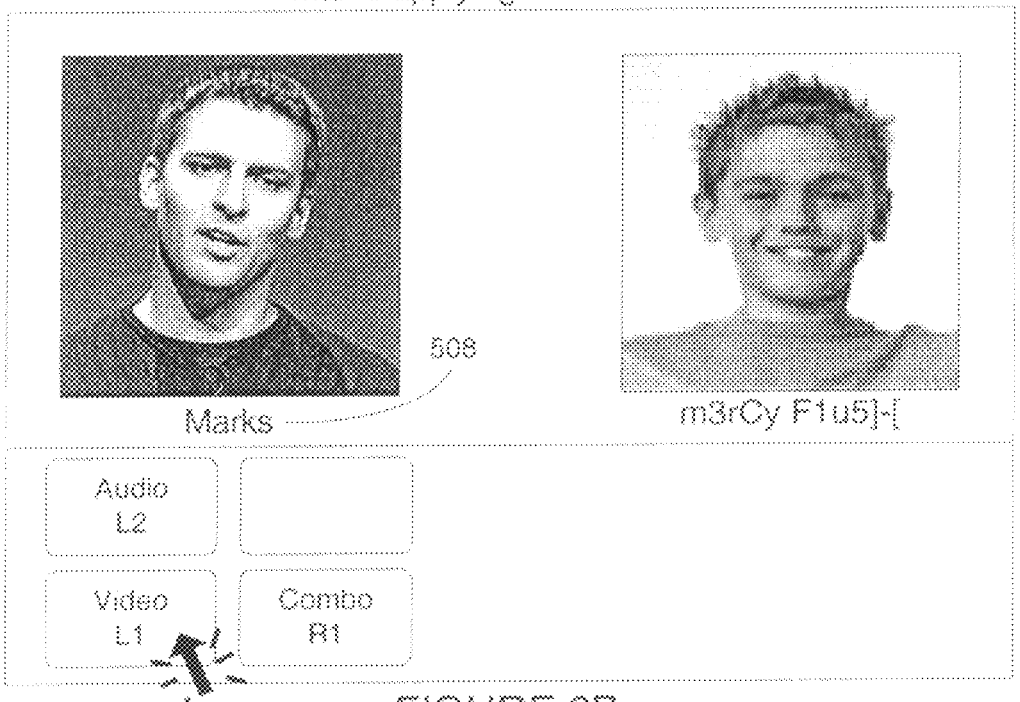
Figure 6C:
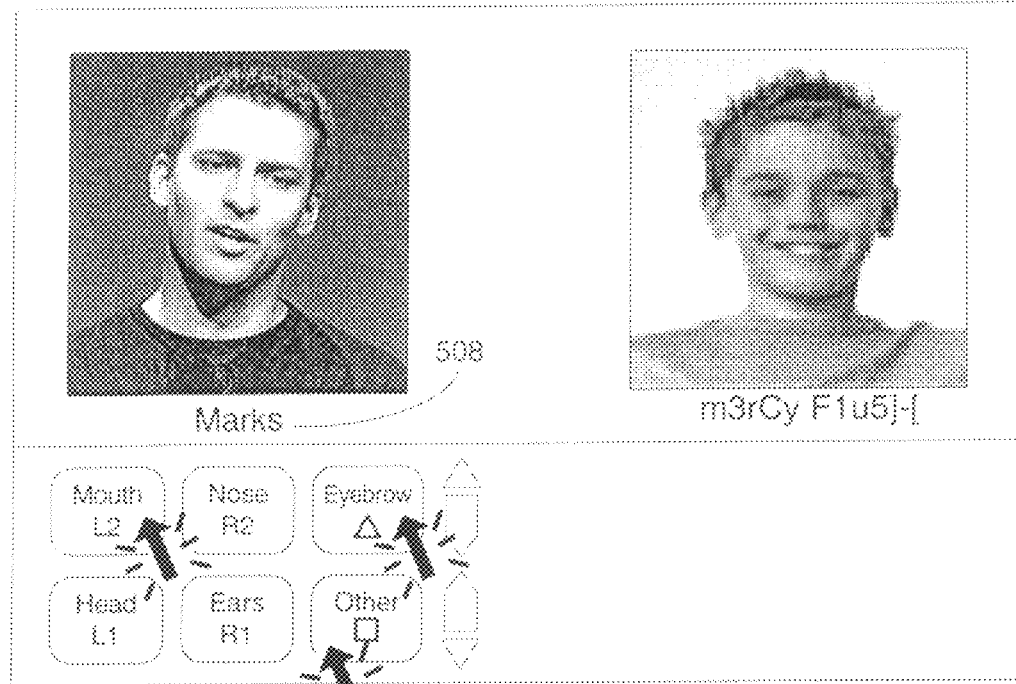
Figure 6D:
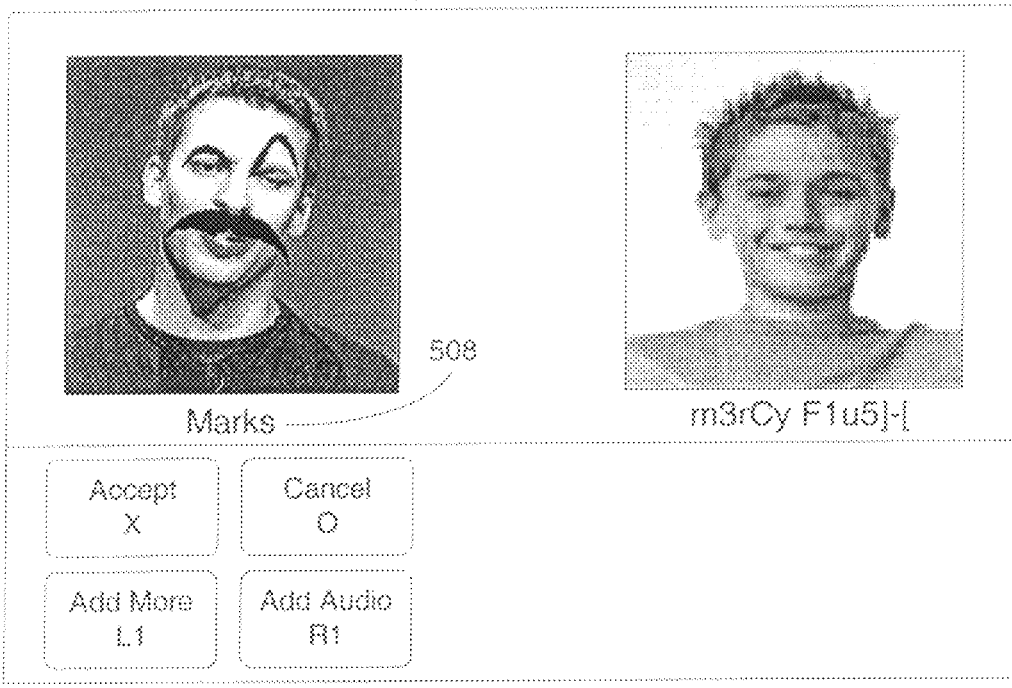

FIGS. 6A-6D illustrate how a user 508 can apply a RTE to himself in order to emphasize an emotion in accordance with one embodiment of the present invention. FIG. 6A shows that the user 508 (Marks) is conducting a video chat with user 504 (m3rCy F1u7]-[). To apply a RTE to his own streaming video the user 508 presses L1 that takes us to FIG. 6B. To progress from FIG. 6B to 6C the user 508 presses L1 to initiate the application of a video RTE. Having already discussed examples of how an RTE may be selected, FIG. 6C summarizes the areas of the user's 508 face which may receive an applied RTE. FIG. 6D shows the application of the RTE. In one embodiment the video RTE will remain for a predetermined period of time. In another embodiment the video RTE will stay in place tracking the users movements until the initiator or the RTE cancels the RTE.

Figure 7A:
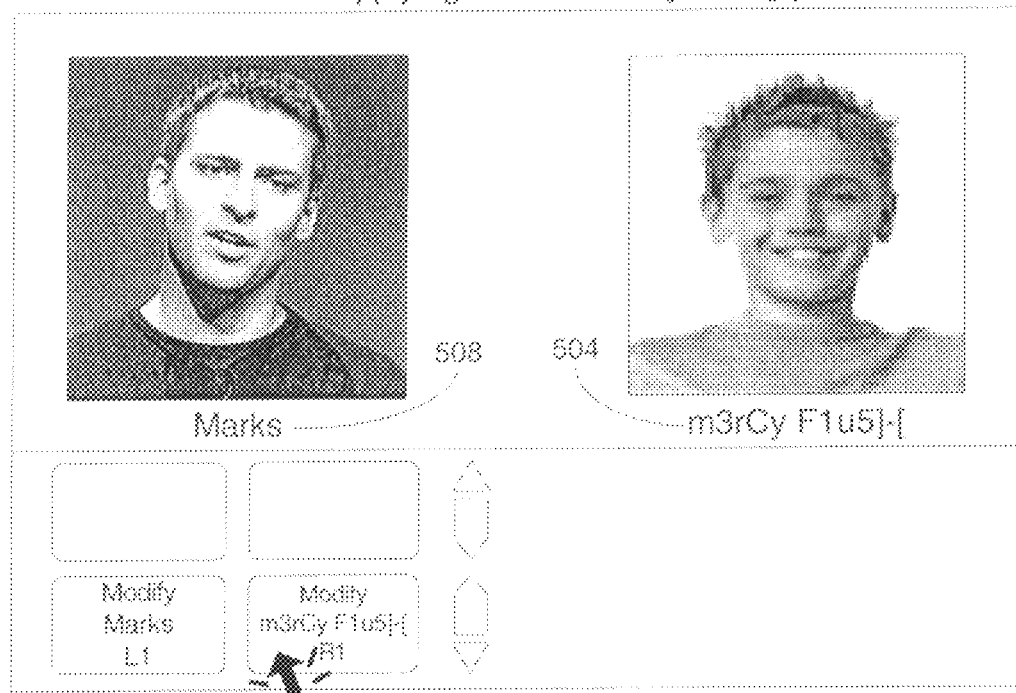
FIGS. 7A-7C show how a user (Marks) can apply a RTE to a user (m3rCy F1us]-[) in accordance with one embodiment of the present invention.
Figure 7B:
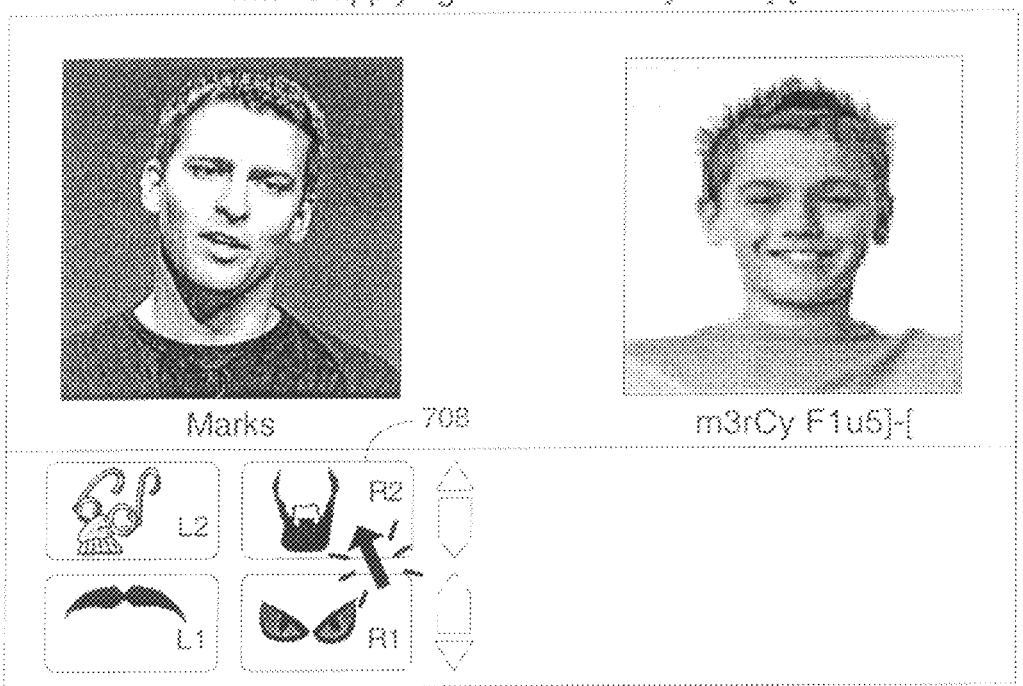
Figure 7C:
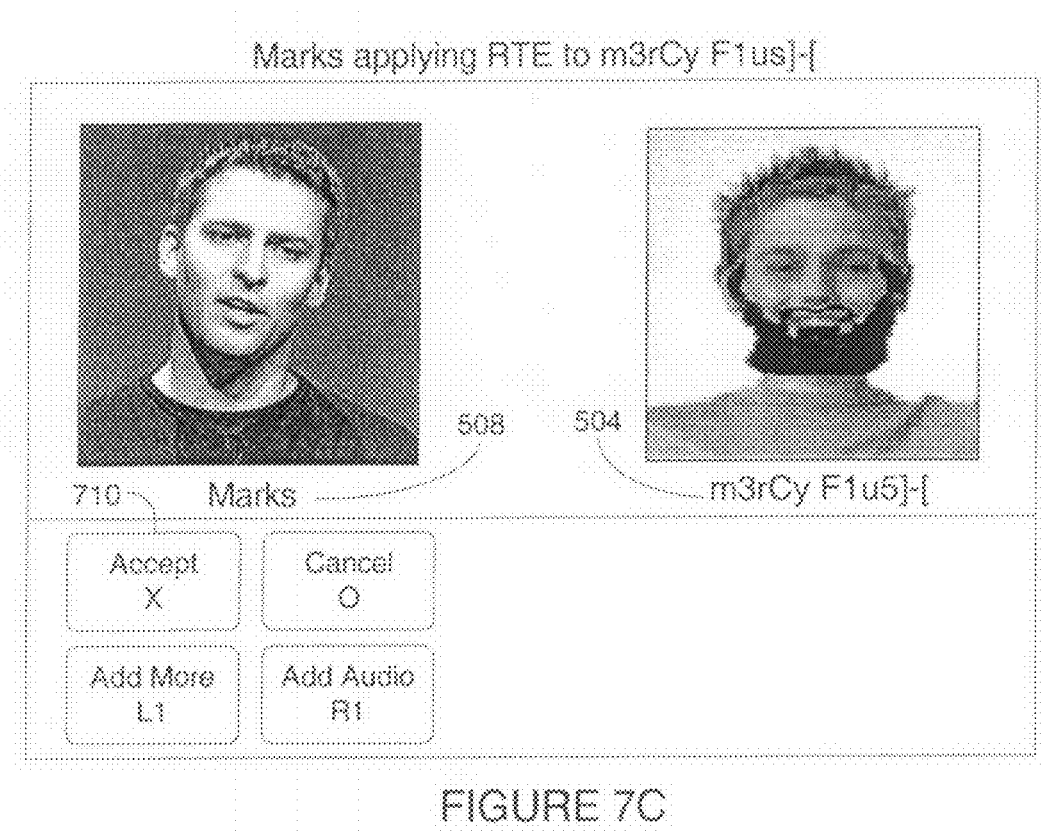

FIGS. 7A-7C show how a user 508 (Marks) can apply a RTE to a user 504 (m3rCy F1us]-[) in accordance with one embodiment of the present invention. FIG. 7A is where the user 508 selects to apply a RTE to the user 504. Since the process a user undertakes to select a RTE was previously covered the steps have been omitted and FIG. 7B shows the user 508 selecting the RTE to apply to the user 504. From FIG. 7C the user 508 chooses to accept the RTE by selecting the icon labeled 710 resulting in the RTE being applied to user 504. Once the user 508 accepts the RTE by pressing the corresponding button on his controller the user 504 will have the RTE applied to his video image. All participants in the video chat will see the user 504 with the RTE applied. Because the video RTE was applied by the user 508 to the user 504 the duration of the video RTE will only be for a predetermined period of time. In another embodiment the video RTE would stay in place until the sender, user 508, sends a command canceling the RTE.

In another embodiment RTE will not be visible to all participants because a user can choose to not allow RTE to be applied to their video stream because of the potentially offensive nature of RTE. Furthermore, pre-defined RTE can be assigned maturity ratings similar to movie ratings from the Motion Picture Association of America or the video game ratings conducted by the Entertainment Software Rating Board. This would allow the system 100 to filter incoming RTE to ensure that only pre-defined RTE within a specific rating are displayed. This feature would assist parents in making sure their children are not exposed to potentially offensive RTE.

Figure 8A:
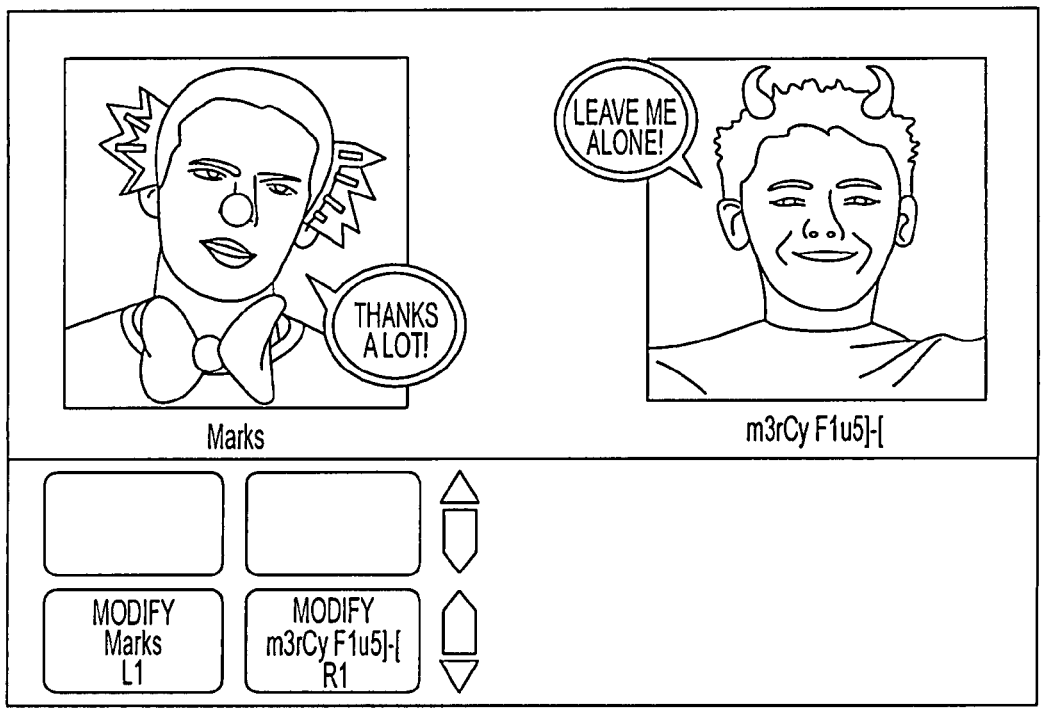
FIG. 8A demonstrates multiple video RTE and a graphical representation of verbal communication between the users in accordance with one embodiment of the present invention.

To clarify the application of custom video effects assume the user 508 selected a custom RTE from FIG. 7B. In order for the custom video effects of the user 508 to be displayed on the screen of the user 504 the effect will need to be transmitted across the network 128. Once transmitted, the custom video effect can be cached in the system of the user 504 but the user 504 will not be able to voluntarily use the custom video effect. In one embodiment, if the system the user 504 is using has been configured to reject custom RTE the RTE sent from the user 508 will not be displayed to the user 504. FIG. 8A demonstrates multiple video RTE and a graphical representation of verbal communication between the users in accordance with one embodiment of the present invention. As previously discussed these effects could be applied as a theme or individually selected by a user.

Figure 8B:
FIG. 8B shows the result of a fire and smoke video effect when applied to a users forearms and hands in accordance with one embodiment of the present invention.

FIG. 8B shows the result of a fire and smoke video effect when applied to a users forearms and hands in accordance with one embodiment of the present invention. Recall that the effects are video effects and the flames and smoke may, in one embodiment, follow the user's movement.

Figure 8C:
FIG. 8C shows the result of applying a water effect over the video feed in accordance with one embodiment of the present invention.

FIG. 8C shows the result of applying a water effect over the video feed in accordance with one embodiment of the present invention. This effect can be applied to a specific area of the video feed or broadly to the entire viewable area.

Figure 8D:
FIG. 8D demonstrate an effect that superimposes butterflies on a user's video feed in accordance with one embodiment of the present invention.

FIG. 8D demonstrate an effect that superimposes butterflies on a user's video feed in accordance with one embodiment of the present invention. In this example the butterflies are "in front" of the user. This example shows how effects can be placed in the user's environment and enables the themes, discussed above, to have backgrounds and foregrounds.

Figure 8E:
FIG. 8E demonstrates an effect where virtual spiders are interacting with a user in accordance with one embodiment of the present invention.

FIG. 8E demonstrates an effect where virtual spiders are interacting with a user in accordance with one embodiment of the present invention. This example shows how a user can "pick up" and move a virtual spider. The virtual spiders, like an RTE, can also be applied to the image of the other person of the video chat.

While the discussion of the RTE performed by the system 100 has been primarily devoted to video processing the system 100 is also capable of performing RTE on audio input. FIGS. 4A and 4B show predefined and custom video libraries but they could also be shown as a predefined and custom audio library. Just like their video counterparts, the effects from the audio libraries can be triggered by a user or automatically by the system. Similarly, the audio effect will be substantially real time because of the delay required to process the effect and the transmission delay across the network 128.

The audio RTE would be initiated in the same manner as the video RTE as shown in FIGS. 4A-4F except applying audio RTE instead of video RTE. For example, when choosing the RTE the user applying the effect would hear a short preview that the other users could not hear. The duration of the audio RTE would also be configurable ranging from automatically stopping the RTE after a few seconds to waiting for a user to cancel the effect.

Examples of possible audio RTE include shifting the pitch of a users voice up or down, and adding echo and reverberation. Modifications to a user's voice are not the only application of audio RTE. Pre-recorded sounds, similar to what disc jockeys use during radio broadcasts, would be available for users to initiate or automatically added by the system 100. The combination of audio and video RTE will make the communications experience using system 100 much richer, engaging and interactive than other forms of communications.

Figure 9A:
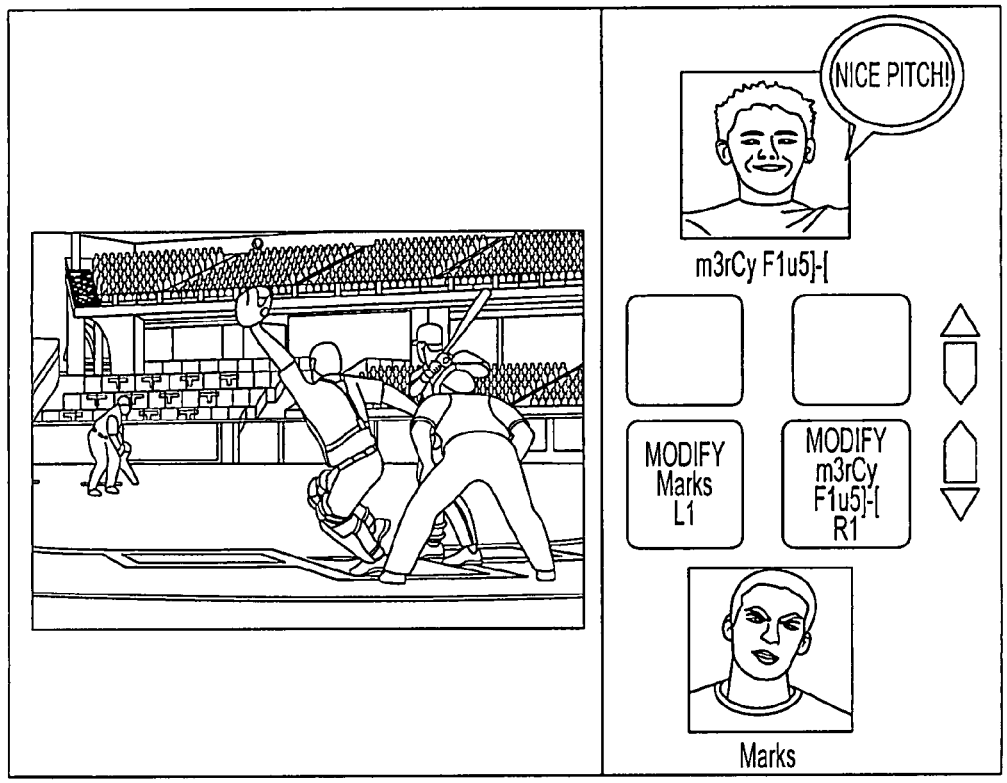
FIG. 9A shows how the video chat with RTE could be implemented with online games in accordance with one embodiment of the present invention.

FIG. 9A shows how the video chat with RTE could be implemented with online games in accordance with one embodiment of the present invention. This embodiment shows the two users off to the side of the game being played, however their video images could be placed over the game screen 902 in order to maximize game viewing area of a display. In this embodiment the RTE can be initiated by either any of the users or automatically by the system depending on the software being manipulated.

User initiation of the RTE can be accomplished using the controller or by voice command. Automatic initiation of the RTE by the system would be triggered by specific events occurring. For example, if the system 100 was running a baseball simulation and one user hits a grand slam the video RTE would turn their eyes into animated dollar signs and the audio RTE would play a cash register "cha-ching" sound in the background. Conversely, their opponent could have animated tears placed on their face and the sound of a baby crying in the background.

Figure 9B:
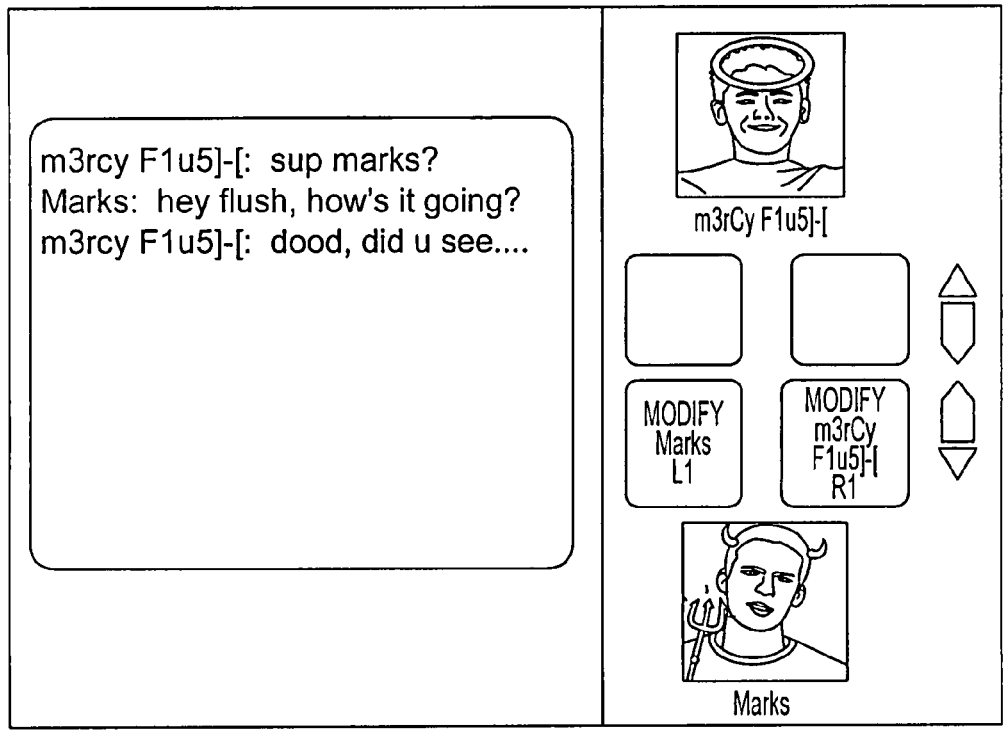
FIG. 9B demonstrate how the video chat could compliment an online text/voice chat application (e.g., like instant messaging "IM") in accordance with one embodiment of the present invention.

FIG. 9B demonstrate how the video chat could compliment an online text/voice chat application (e.g., like instant messaging "IM") in accordance with one embodiment of the present invention. This application would be a step forward from current instant messaging and video messaging because of the ability to apply RTE to both the video and audio from other users. The benefit of this application is that it would allow people who have lost their voice the ability to communicate using an instant messenger typing system while expressively communicating their emotions using the video RTE. The application could also be used to convert voice chat into text chat or even output Braille to assist the hearing and sight impaired.

Figure 10:
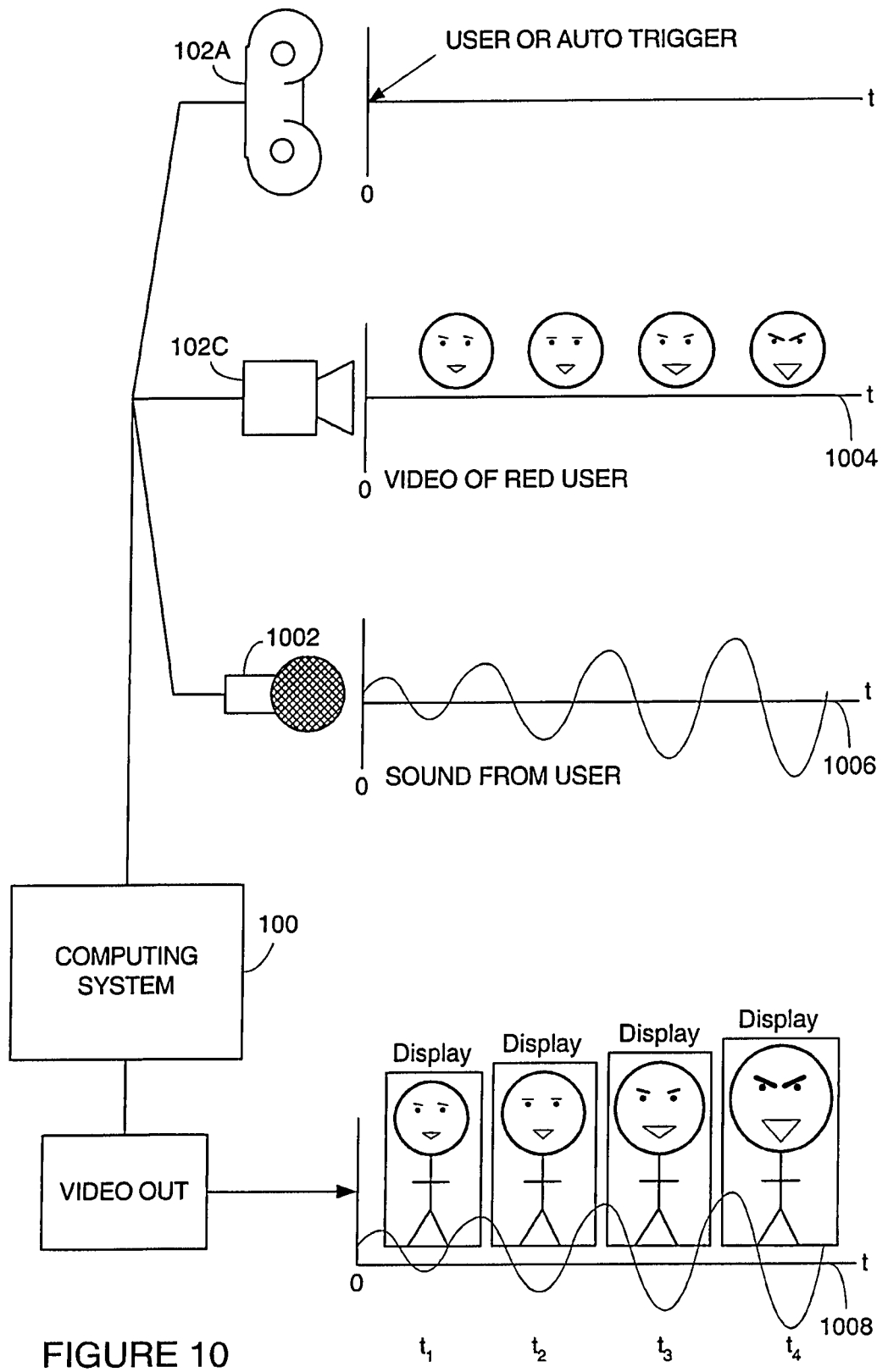
FIG. 10 shows how the RTE augments the video and audio output based on feedback from the user after the RTE is triggered in accordance with one embodiment of the present invention.

FIG. 10 shows how the RTE augments the video and audio output based on feedback from the user after the RTE is triggered in accordance with one embodiment of the present invention. System 100 has a microphone 1002, a video camera 102C and a controller 102A attached. A RTE is triggered at time is at zero either automatically or by the user. Once the RTE is triggered the system 100 begins processing the effect and begins receiving feedback from the video camera 102C and the microphone 1002 regarding the user's facial expression and voice. At time 1, the video camera and microphone receive the image and sound shown at time 1 on their respective graphs 1004 and graph 1006. The RTE are processed and outputs the image and sound shown in graph 1008. Progressing to time 2, the user continues to speak, but as seen at time 2 on the graph 1006 the user is speaking louder and at time 1. Accordingly, the RTE modifies the output image making the users head slightly larger and opening the users mouth slightly wider.

At time 3, the user continues to speak but louder than at time 2 as shown in the graph 1006. Additionally, the user has furrowed his brow and opened his mouth wider as shown in the graph 1004. The RTE receives this feedback and further increases the size of the user's head, makes the user's eyebrows bushier and opens the user's mouth even more. At this point an audio RTE could be implemented such as making the user's voice deeper and more menacing or conversely, gradually increasing in pitch. Finally, at time 4, the user has continued to become louder than at time 3 as indicated by the intensity on the graph 1006. The mouth of the user is wide open and the eyebrows indicate anger as shown in the graph 1004. As shown on graph 1008 the RTE has increased the size of the user's head, made the eyebrows bushier, and really opened up the user's mouth. The user's eyes could also be animated with flames or simply turned a menacing shade of red to further convey anger.

Another example of where video feedback could be used to augment a RTE is in a vomiting RTE. After the triggering of the vomit RTE the video camera 102C can monitor the user's mouth only allowing vomit to spew forth if the user's mouth is open. Along the same vein, if the user's mouth remains closed, the RTE could be animated to show the user's cheeks expanding and their face turning green. The listed examples are not a complete list of the possible effects that could be enhanced by feedback from the video camera 102C and the microphone 1002. It should be understood that there are countless different embodiments where the use of a microphone and camera for feedback can enhance RTE.

Figure 11:
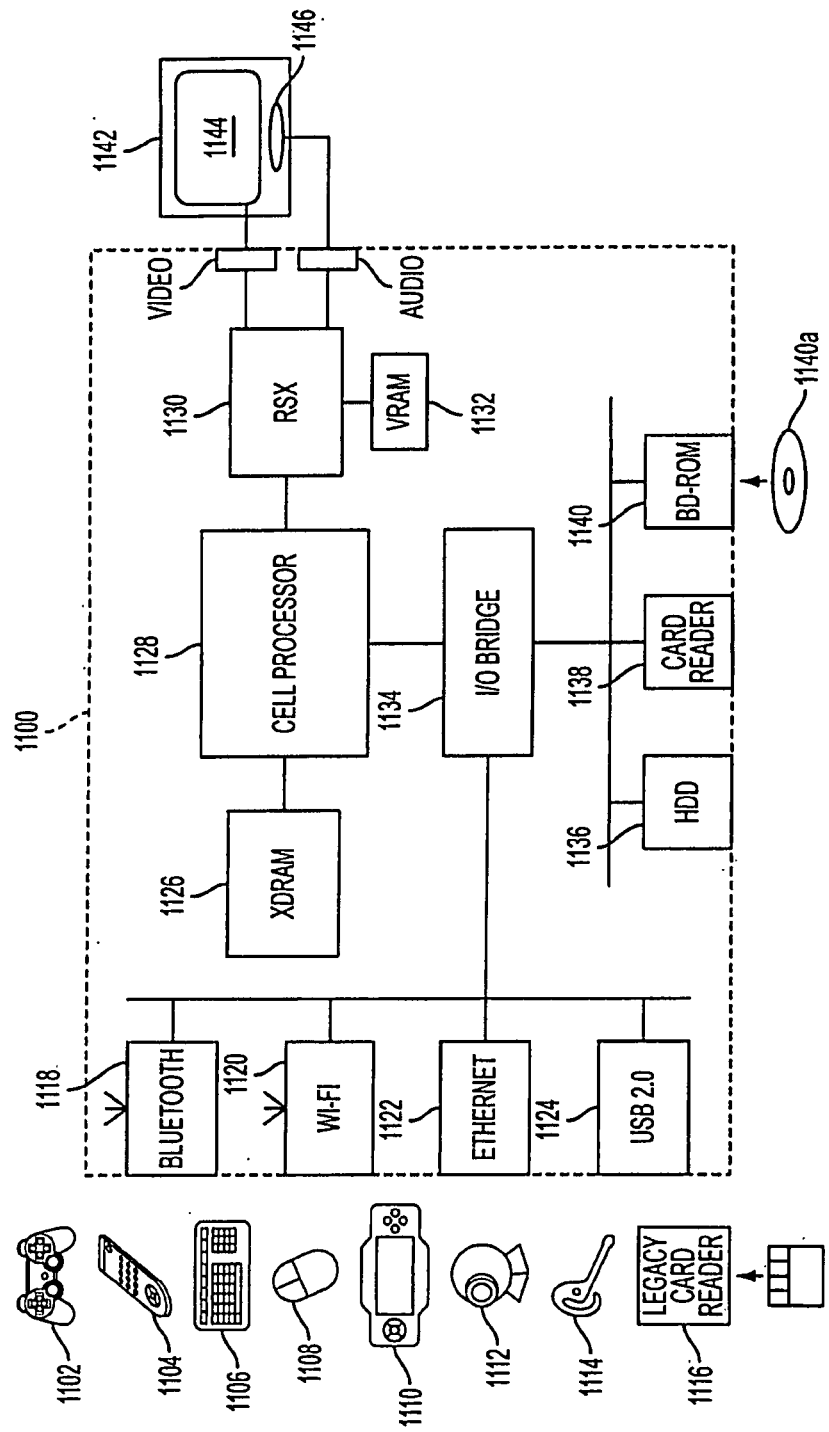
FIG. 11 schematically illustrates the overall system architecture of the Sony® Playstation 3® entertainment device, a console that may be compatible with controllers for implementing an avatar control system in accordance with one embodiment of the present invention.

FIG. 11 schematically illustrates the overall system architecture of the Sony® Playstation 3® entertainment device, a console that may be compatible with controllers for implementing an avatar control system in accordance with one embodiment of the present invention. A system unit 1100 is provided, with various peripheral devices connectable to the system unit 1100. The system unit 1100 comprises: a Cell processor 1128; a Rambus® dynamic random access memory (XDRAM) unit 1126; a Reality Synthesizer graphics unit 1130 with a dedicated video random access memory (VRAM) unit 1132; and an I/O bridge 1134. The system unit 1100 also comprises a Blu Ray® Disk BD-ROM® optical disk reader 1140 for reading from a disk 1140a and a removable slot-in hard disk drive (HDD) 1136, accessible through the I/O bridge 1134. Optionally the system unit 1100 also comprises a memory card reader 1138 for reading compact flash memory cards, Memory Stick® memory cards and the like, which is similarly accessible through the I/O bridge 1134.

The I/O bridge 1134 also connects to six Universal Serial Bus (USB) 2.0 ports 1124; a gigabit Ethernet port 1122; an IEEE 802.11b/g wireless network (Wi-Fi) port 1120; and a Bluetooth® wireless link port 1118 capable of supporting of up to seven Bluetooth connections.

In operation the I/O bridge 1134 handles all wireless, USB and Ethernet data, including data from one or more game controllers 1102. For example when a user is playing a game, the I/O bridge 1134 receives data from the game controller 1102 via a Bluetooth link and directs it to the Cell processor 1128, which updates the current state of the game accordingly.

The wireless, USB and Ethernet ports also provide connectivity for other peripheral devices in addition to game controllers 1102, such as: a remote control 1104; a keyboard 1106; a mouse 1108; a portable entertainment device 1110 such as a Sony Playstation Portable® entertainment device; a video camera such as an EyeToy® video camera 1112; and a microphone headset 1114. Such peripheral devices may therefore in principle be connected to the system unit 1100 wirelessly; for example the portable entertainment device 1110 may communicate via a Wi-Fi ad-hoc connection, whilst the microphone headset 1114 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1116 may be connected to the system unit via a USB port 1124, enabling the reading of memory cards 1148 of the kind used by the Playstation® or Playstation 2® devices.

In the present embodiment, the game controller 1102 is operable to communicate wirelessly with the system unit 1100 via the Bluetooth link. However, the game controller 1102 can instead be connected to a USB port, thereby also providing power by which to charge the battery of the game controller 1102. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1104 is also operable to communicate wirelessly with the system unit 1100 via a Bluetooth link. The remote control 1104 comprises controls suitable for the operation of the Blu Ray™ Disk BD-ROM reader 1140 and for the navigation of disk content.

The Blu Ray™ Disk BD-ROM reader 1140 is operable to read CD-ROMs compatible with the Playstation and PlayStation 2 devices, in addition to conventional pre-recorded and recordable CDs, and so-called Super Audio CDs. The reader 1140 is also operable to read DVD-ROMs compatible with the Playstation 2 and PlayStation 3 devices, in addition to conventional pre-recorded and recordable DVDs. The reader 1140 is further operable to read BD-ROMs compatible with the Playstation 3 device, as well as conventional pre-recorded and recordable Blu-Ray Disks.

The system unit 1100 is operable to supply audio and video, either generated or decoded by the Playstation 3 device via the Reality Synthesizer graphics unit 1130, through audio and video connectors to a display and sound output device 1142 such as a monitor or television set having a display 1144 and one or more loudspeakers 1146. The audio connectors 1150 may include conventional analogue and digital outputs whilst the video connectors 1152 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1128. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1112 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1100. The camera LED indicator is arranged to illuminate in response to appropriate control data from the system unit 1100, for example to signify adverse lighting conditions. Embodiments of the video camera 1112 may variously connect to the system unit 1100 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1100, an appropriate piece of software such as a device driver should be provided. Device driver technology is well-known and will not be described in detail here, except to say that the skilled man will be aware that a device driver or similar software interface may be required in the present embodiment described.

Figure 12:
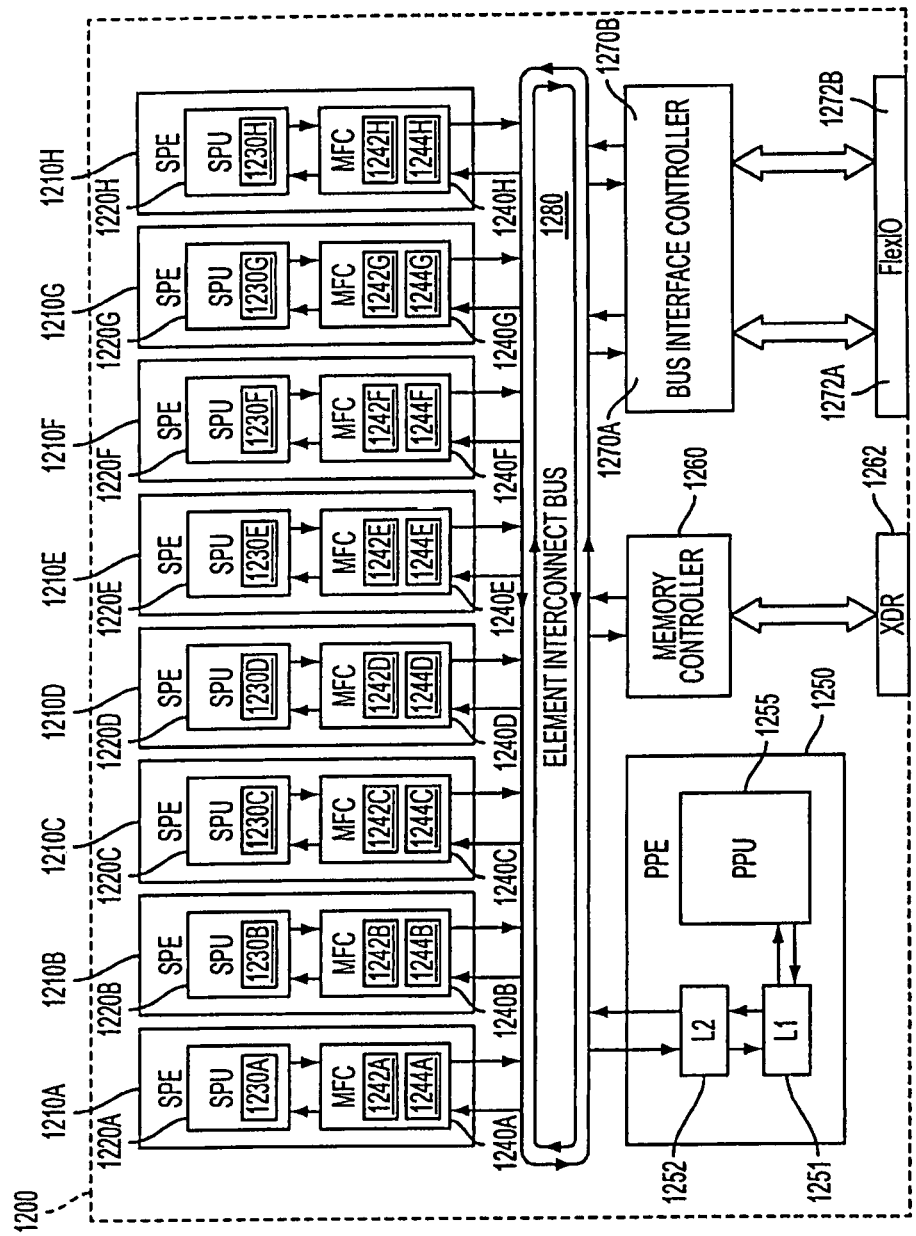
FIG. 12 schematically illustrates the architecture of the Cell processor, in accordance with one embodiment of the present invention.

Referring now to FIG. 12, the Cell processor 1128 has an architecture comprising four basic components: external input and output structures comprising a memory controller 1260 and a dual bus interface controller 1270A,B; a main processor referred to as the Power Processing Element 1250; eight co-processors referred to as Synergistic Processing Elements (SPEs) 1210A-H; and a circular data bus connecting the above components referred to as the Element Interconnect Bus 1280. The total floating point performance of the Cell processor is 218 GFLOPS, compared with the 6.2 GFLOPs of the Playstation 2 device's Emotion Engine.

The Power Processing Element (PPE) 1250 is based upon a two-way simultaneous multithreading Power 970 compliant PowerPC core (PPU) 1255 running with an internal clock of 3.2 GHz. It comprises a 512 kB level 2 (L2) cache and a 32 kB level 1 (L1) cache. The PPE 1250 is capable of eight single position operations per clock cycle, translating to 25.6 GFLOPs at 3.2 GHz. The primary role of the PPE 1250 is to act as a controller for the Synergistic Processing Elements 1210A-H, which handle most of the computational workload. In operation the PPE 1250 maintains a job queue, scheduling jobs for the Synergistic Processing Elements 1210A-H and monitoring their progress. Consequently each Synergistic Processing Element 1210A-H runs a kernel whose role is to fetch a job, execute it and synchronized with the PPE 1250.

Each Synergistic Processing Element (SPE) 1210A-H comprises a respective Synergistic Processing Unit (SPU) 1220A-H, and a respective Memory Flow Controller (MFC) 1240A-H comprising in turn a respective Dynamic Memory Access Controller (DMAC) 1242A-H, a respective Memory Management Unit (MMU) 1244A-H and a bus interface (not shown). Each SPU 1220A-H is a RISC processor clocked at 3.2 GHz and comprising 256 kB local RAM 1230A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1220A-H does not directly access the system memory XDRAM 1126; the 64-bit addresses formed by the SPU 1220A-H are passed to the MFC 1240A-H which instructs its DMA controller 1242A-H to access memory via the Element Interconnect Bus 1280 and the memory controller 1260.

The Element Interconnect Bus (EIB) 1280 is a logically circular communication bus internal to the Cell processor 1128 which connects the above processor elements, namely the PPE 1250, the memory controller 1260, the dual bus interface 1270A,B and the 8 SPEs 1210A-H, totaling 12 participants. Participants can simultaneously read and write to the bus at a rate of 8 bytes per clock cycle. As noted previously, each SPE 1210A-H comprises a DMAC 1242A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1260 comprises an XDRAM interface 1262, developed by Rambus Incorporated. The memory controller interfaces with the Rambus XDRAM 1126 with a theoretical peak bandwidth of 25.6 GB/s.

The dual bus interface 1270A,B comprises a Rambus FlexIO® system interface 1272A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 1134 via controller 1272A and the Reality Simulator graphics unit 1130 via controller 1272B.

Data sent by the Cell processor 1128 to the Reality Simulator graphics unit 1130 will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery.

With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The present invention may be used as presented herein or in combination with other user input mechanisms and notwithstanding mechanisms that track the angular direction of the sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as buttons, pressure pad, etc. that may influence the transmission or modulation of the same, encode state, and/or transmit commands from or to the device being tracked.

The invention may be practiced with other computer system configurations including game consoles, gaming computers or computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network.

For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the foregoing invention has been described in some detail for purposes of clarity of understanding, it will be apparent that certain changes and modifications may be practiced within the scope of the embodiments defined herein. Accordingly, the present embodiments are to be considered as illustrative and not restrictive, and the invention is not to be limited to the details given herein, but may be modified within the scope and equivalents of the described embodiments.

What is claimed is:

1. A computer implemented method for interactively modifying a video image, the video image transmitted between a first user and a second user using a computer program that is executed on at least one computer in a computer network and each of the first user and the second user interacting through a respective computing system that is executing a computer program, comprising:

capturing real-time video of the first user;

detecting selection received from the first user or second user of a real-time graphic effect from a group of real-time graphic effects, the group of real-time graphic effects being predefined;

identifying components of the video image of the first user to be modified using the selected real-time graphic effect in the captured real-time video;

identifying controller input from either the first user or the second user, the controller input being detected by the computing system, and the identification of the controller input determines which of the identified components in the video image of the first user will be modified;

applying the selected real-time graphic effect to the identified components of the video image of the first user in response to the identified controller input, and the real-time video captured of the first user is augmented with the selected real-time graphic effect, and movements of the first user are tracked so that the selected real-time graphic effect dynamically moves with the movements of the first user, wherein applying the selected real-time graphic effect to the identified components of the video image comprises applying changes to pixel data contained in multiple pixel regions of the video image so that each video frame of the video image is interactively augmented with the selected real-time graphic effect in correspondence to the movements of the first user, wherein applying the selected real-time graphic effect to the identified components includes directing the application of changes to the pixel data contained in the pixel regions of the video image, and the selected real-time graphic effect includes pre-defined video animations, or themes, or custom video animations, and or a combination thereof; and providing data for displaying the augmented real-time video of the first user on a screen connected to the computing system of one or both of the first and second users, wherein the computer implemented method is executed by a processor.

2. A computer implemented method for interactively modifying a video image, the video image transmitted between a first user and a second user using a computer program that is executed on at least one computer in a computer network and each of the first user and the second user interacting through a respective computing system that is executing the computer program, comprising:

capturing real-time video of the first user;

detecting selection received from the first user or second user of a real-time graphic effect from a group of real-time graphic effects, the group of real-time effects being predefined;

identifying components of the video image of the first user to be augmented using the selected real-time graphic effect in the captured real-time video;

identifying controller input from either the first user or the second user, the controller input being detected by the computing system, and the identification of the controller input determines which of the identified components in the video image of the first user will be modified;

applying the selected real-time graphic effect to the identified components of the video image of the first user in response to the identified controller input, and the real-time video captured of the first user is augmented with the selected real-time graphic effect, and movements of the first user are tracked so that the selected real-time graphic effect dynamically moves with the movements of the first user; and providing data for displaying augmented real-time video of the first user on a screen connected to the computing system of one or both of the first and second users, wherein the computer implemented method is executed by a processor, wherein interactively modifying a video image includes:

identification of pixel regions of the video image to identify characteristics of the first user;

tracking the pixel regions over one or more frames; and applying changes to pixel data contained in the pixel regions so that each video frame of the video image is interactively augmented with the selected real-time graphic effect in correspondence to the movements of the first user, wherein applying the selected real-time graphic effect to the identified components includes directing the application of changes to the pixel data contained in the pixel regions of the video image, and the selected real-time graphic effect includes pre-defined video animations, or themes, or custom video animations, and or a combination thereof.

3. The computer implemented method of claim 2, wherein the identified components of the video image relate to the characteristics of the first user.

4. The computer implemented method of claim 3, wherein the characteristics of the first user include facial and body components, and the facial and body components are identified by recognizing characteristics that are common in facial and body components.

5. The computer implemented method of claim 4, wherein a location of eyes of the first user defines characteristics that are common facial components.

6. The computer implemented method of claim 1, wherein controller input is defined by user selection of button presses, or motion, or light indicators, or relative positional movement, or a combination thereof.

7. The computer implemented method of claim 6, wherein the controller input detected by the computing system is via a wired or wireless link.

8. A computer implemented method for interactively modifying a video image, the video image transmitted between a first user and a second user using a computer program that is executed on at least one computer in a computer network and each of the first user and the second user interacting through a respective computing system that is executing the computer program, comprising:

capturing real-time video of the first user;

detecting selection received from the first user or second user of a real-time graphic effect from a group of real-time graphic effects, the group of real-time effects being predefined;

identifying components of the video image of the first user to be augmented using the selected real-time graphic effect in the captured real-time video;

identifying controller input from either the first user or the second user, the controller input being detected by the computing system, and the identification of the controller input determines which of the identified components of the first user will be augmented, where determining which of the identified components of the video image of the first user will be augmented is assisted by mapping specific controller inputs to the identified components of the video image;

applying the selected real-time graphic effect to the identified components of the first user in response to the identified controller input, and the real-time video captured of the first user is augmented with the selected real-time graphic effect, and movements of the first user are tracked so that the selected real-time graphic effect dynamically moves with the movements of the first user, wherein applying the selected real-time graphic effect to the identified components of the first user comprises applying changes to pixel data contained in multiple pixel regions so that each video frame of the video image is interactively augmented with the selected real-time graphic effect in correspondence to the movements of the first user, wherein applying the selected real-time graphic to the identified components includes directing the application of changes to the pixel data contained in the pixel regions of the video image, and the selected real-time graphic effect includes pre-defined video animations, or themes, or custom video animations, or a combination thereof; and providing data for displaying the augmented real-time video of the first user on a screen connected to the computing system of one or both of the first and second users, wherein the computer implemented method is executed by a processor.

9. The computer implemented method of claim 2, wherein when the changes to the pixel data are filtered onto the captured real-time video of the first user, the captured real-time video of the first user is in an augmented state.

10. A computer implemented method of claim 1, further comprising capturing audio for communication between the first user and the second user.

11. A computer implemented method for interactively modifying a video image and audio, the video image and audio transmitted between a first user and a second user using a computer program that is executed on at least one computer in a computer network to enable a communication, and each of the first user and the second user interacting through a respective computing system that is executing the computer program, comprising:

capturing real-time video and audio of the first user through a video and audio capture system connected to the computing system of the first user;

receiving a selection of video real-time effects from the first user or the second user;

identifying components of the video image of the first user to be modified using the video real-time effects in the captured real-time video;

identifying audio segments of audio captured by the video and audio capture system to be modified using audio real-time effects;

identifying user input from either the first user or the second user, and the identification of the user input determines which of the identified audio segments of the first user will be modified;

applying the video real-time effects to the identified components of the video image of the first user, wherein movements of the first user are tracked so that the video real-time effects applied to the identified components of the video image dynamically move with the movements of the first user;

applying the audio real-time effects to the audio segments in response to the identified user input; and providing data for outputting real-time video and audio of the first user on a screen connected to the computing system of one or both of the first and second users, the output real-time video and audio including the applied video and audio real-time effects, wherein the computer implemented method is executed by a processor, wherein interactively modifying the video image includes:

identification of pixel regions of the video image to identify characteristics of the first user;

tracking the pixel regions over one or more frames; and applying changes to pixel data contained in the pixel regions so that the video image is interactively modified and the video real-time effects are integrated into the video frames in correspondence to the movements of the first user, wherein applying the video real-time effects to the identified components of the video image includes directing the application of changes to the pixel data contained in the pixel regions of the video image, and the video real-time effects including pre-defined video animations, or themes, or custom video animations, or a combination thereof.

* * * * *